(12) United States Patent
Mouri et al.

(10) Patent No.: US 10,640,034 B1
(45) Date of Patent: May 5, 2020

(54) VEHICLE FRONT HEADLIGHT DEVICE

(71) Applicant: Toyota Jidosha Kabushiki Kaisha, Toyota-shi, Aichi-ken (JP)

(72) Inventors: Fumihiko Mouri, Owariasahi (JP); Takahiko Honda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/695,787

(22) Filed: Nov. 26, 2019

(30) Foreign Application Priority Data

Nov. 28, 2018 (JP) .................................. 2018-222820

(51) Int. Cl.
*B60Q 1/02* (2006.01)
*B60Q 1/26* (2006.01)
*B60Q 1/14* (2006.01)
*F21S 41/675* (2018.01)

(52) U.S. Cl.
CPC ............ *B60Q 1/143* (2013.01); *F21S 41/675* (2018.01)

(58) Field of Classification Search
CPC ..... F21V 23/02; F21V 25/12; H05B 37/0236; A63J 17/00; F21L 14/026; B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60Q 2300/314; B60Q 1/1415; B60Q 2300/42; B60R 16/03; H02K 21/48; B62J 6/001; B62J 6/003; H02J 7/1492

See application file for complete search history.

(56) References Cited

U.S. PATENT DOCUMENTS

2014/0313755 A1    10/2014  Tanaka
2016/0339834 A1*   11/2016  Oshima .................. F21S 41/29
2018/0118095 A1*   5/2018   Kunii .................... B60Q 1/085

FOREIGN PATENT DOCUMENTS

JP        2014-216049 A    11/2014

* cited by examiner

*Primary Examiner* — Minh D A
(74) *Attorney, Agent, or Firm* — Dinsmore & Shohl LLP

(57) ABSTRACT

A vehicle front headlight device including: a first and a second front headlights configuring a left and right pair, each including a light source configured to emit light, a rotating mirror configured to reflect the emitted light while rotating, and a lens configured to allow the reflected light to pass through and shine ahead of a vehicle; and a controller that controls switching ON and OFF of the respective light sources and rotational drive of the respective rotating mirrors of the first and the second front headlights, such that, in a light distribution region formed by illumination of the first and the second front headlights, a first non-illuminated region that is not illuminated by the first front headlight is illuminated by the second front headlight, and a second non-illuminated region that is not illuminated by the second front headlight is illuminated by the first front headlight.

3 Claims, 27 Drawing Sheets

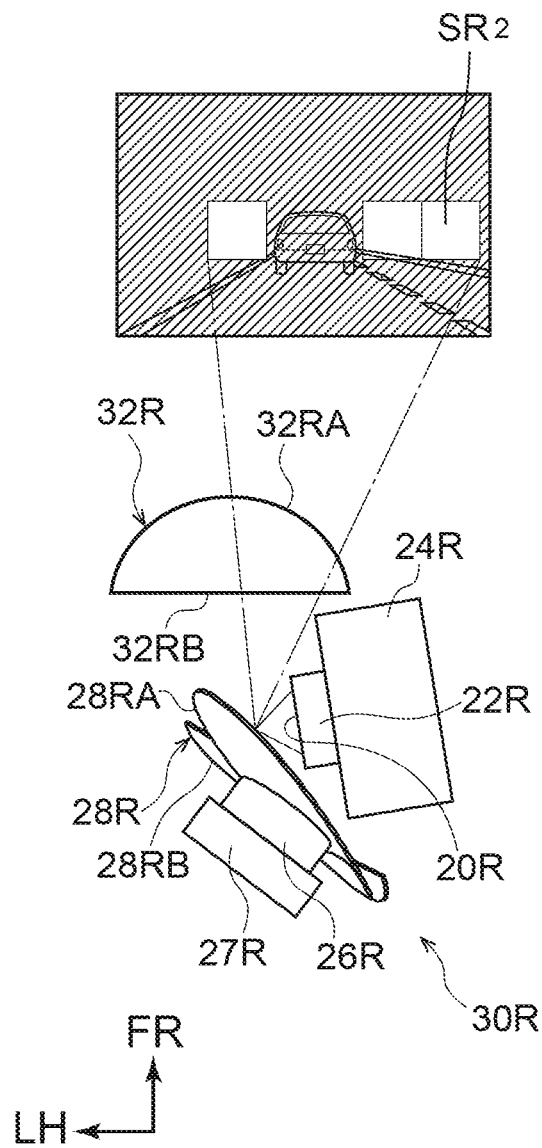

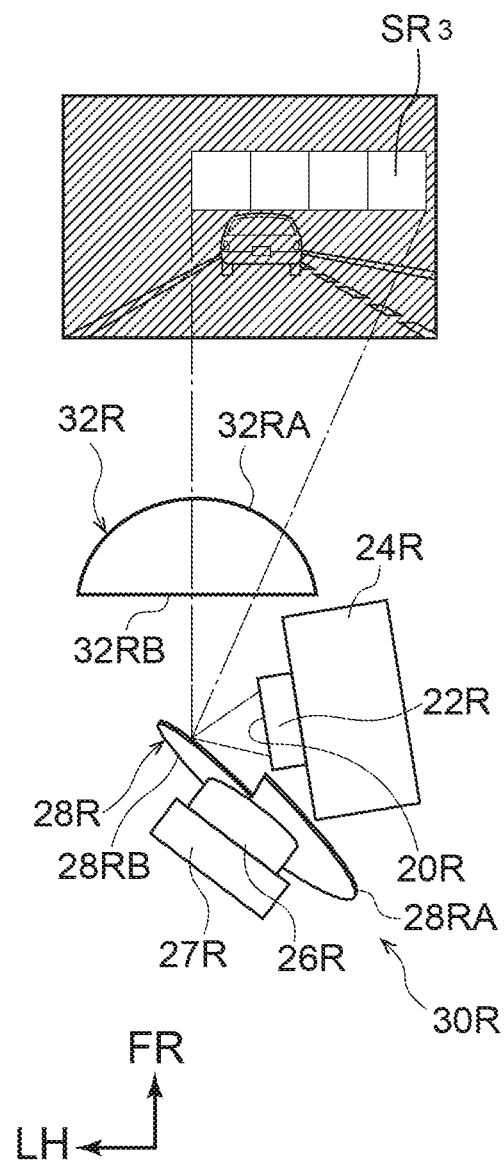

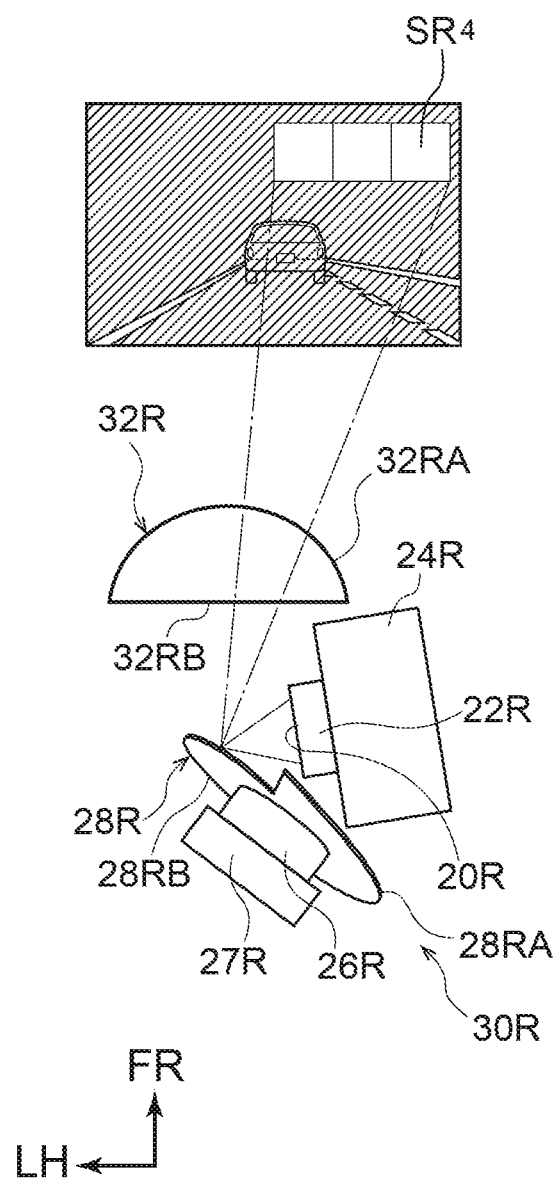

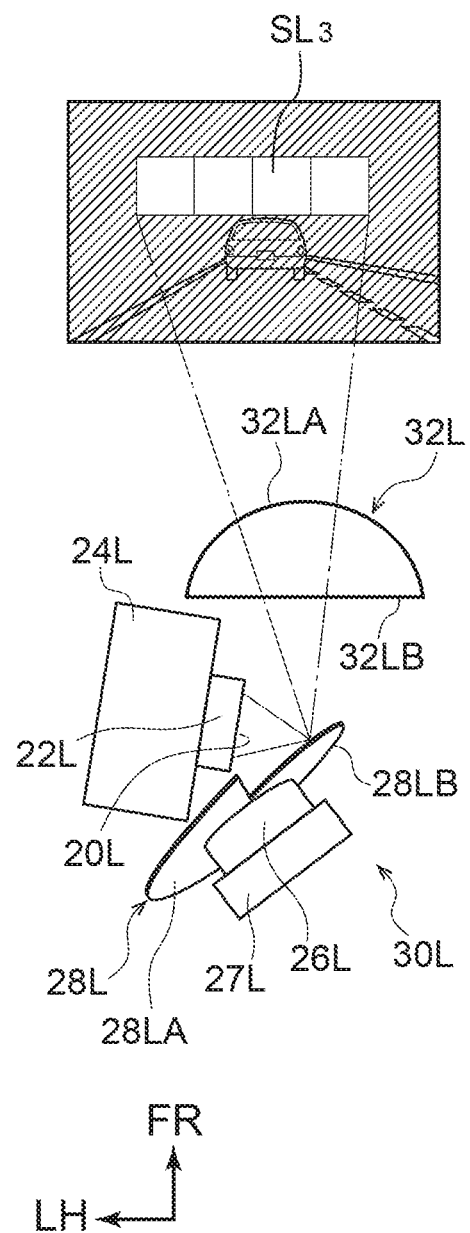

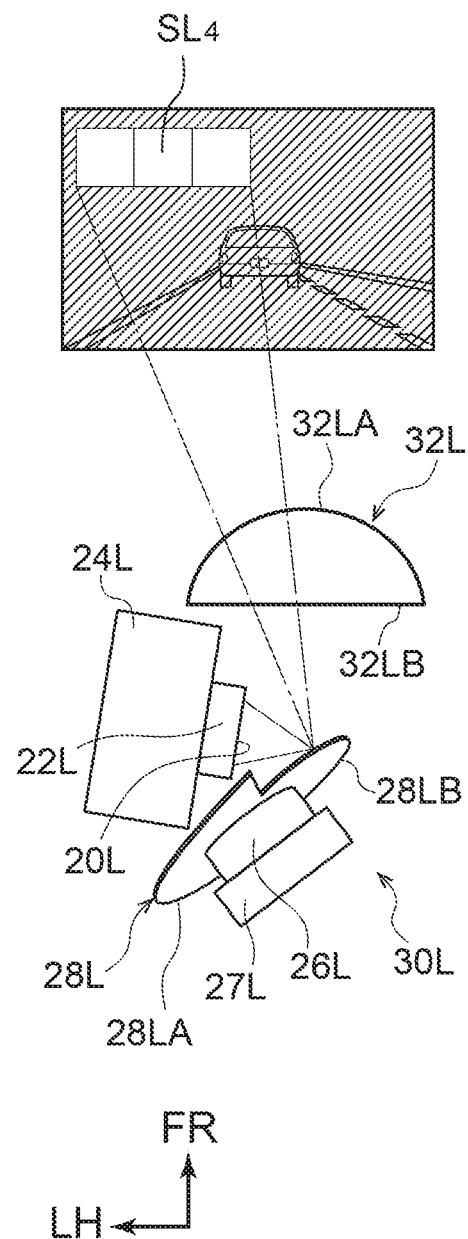

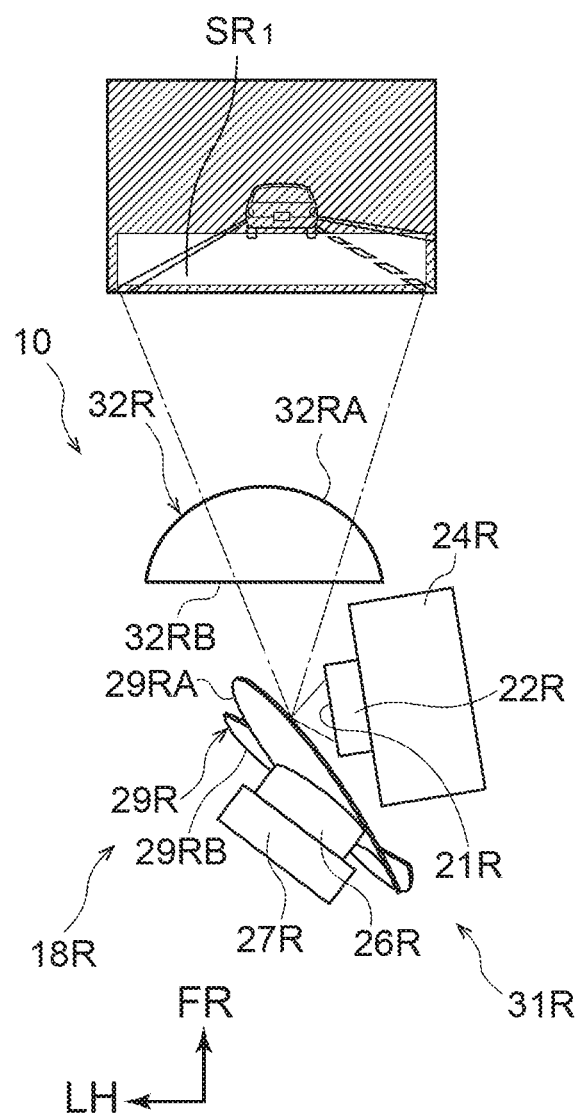

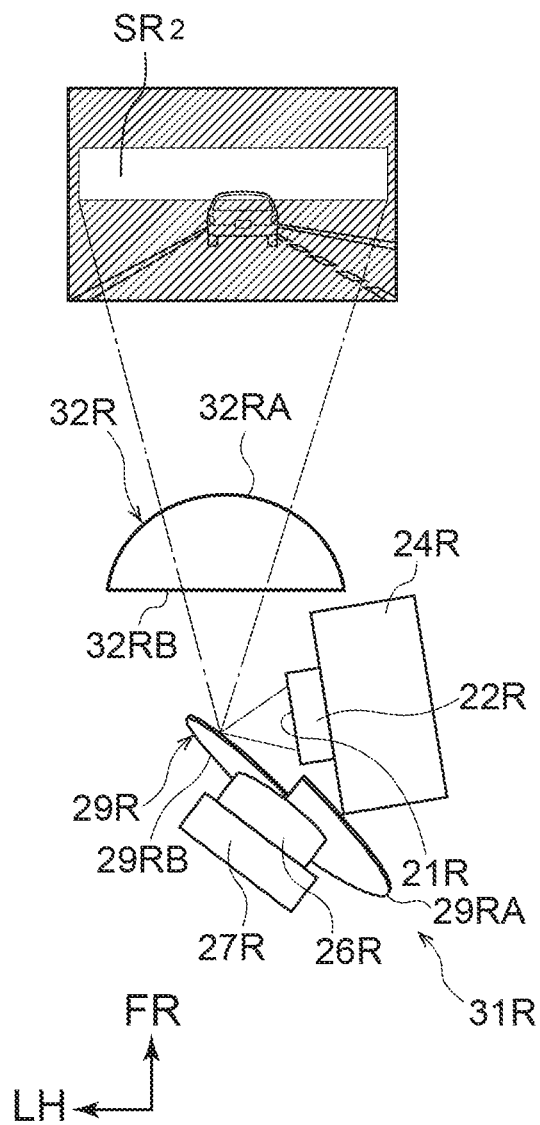

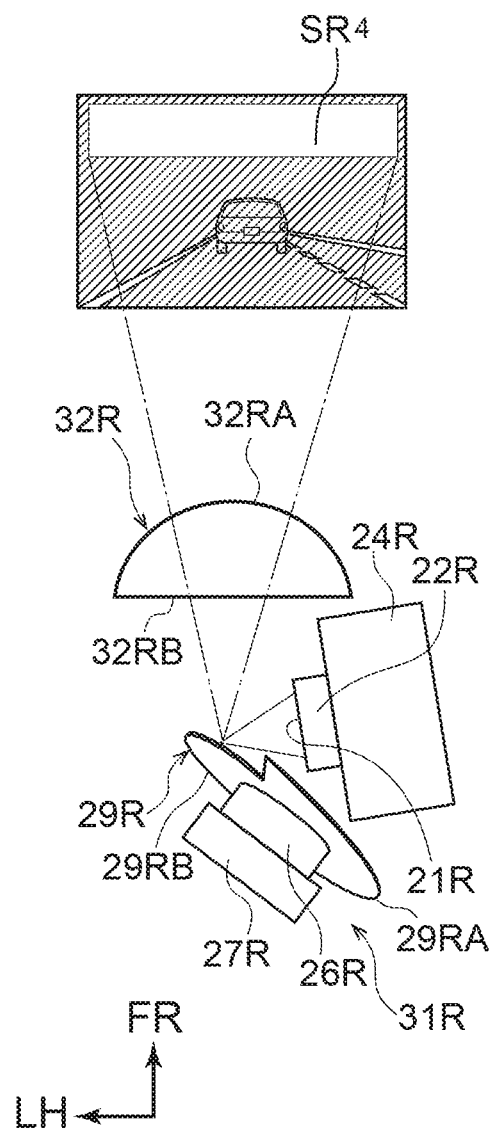

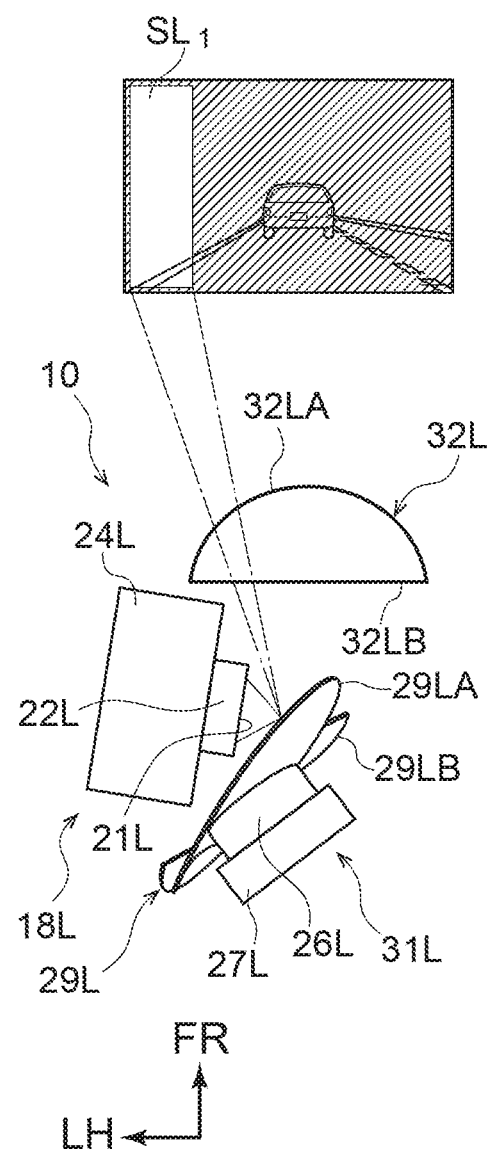

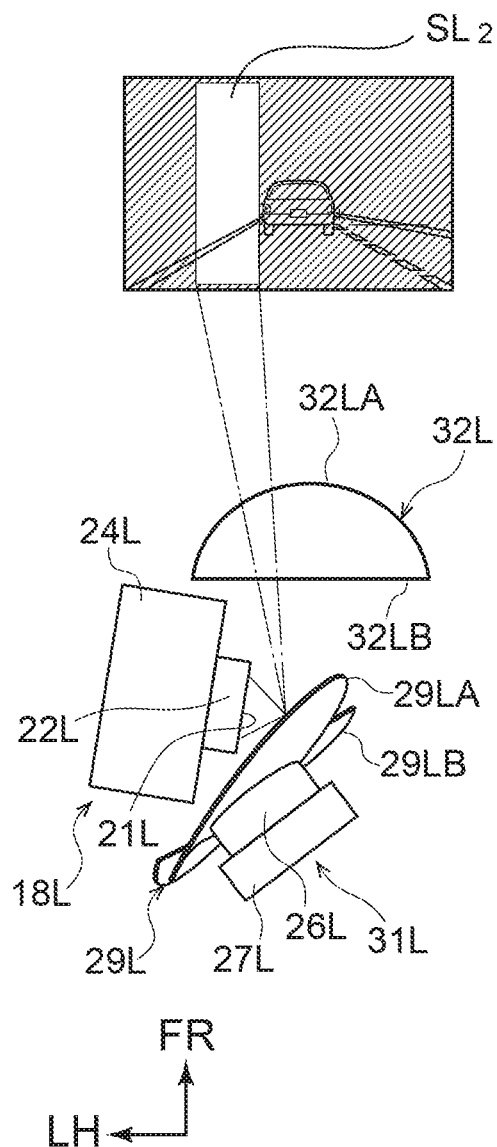

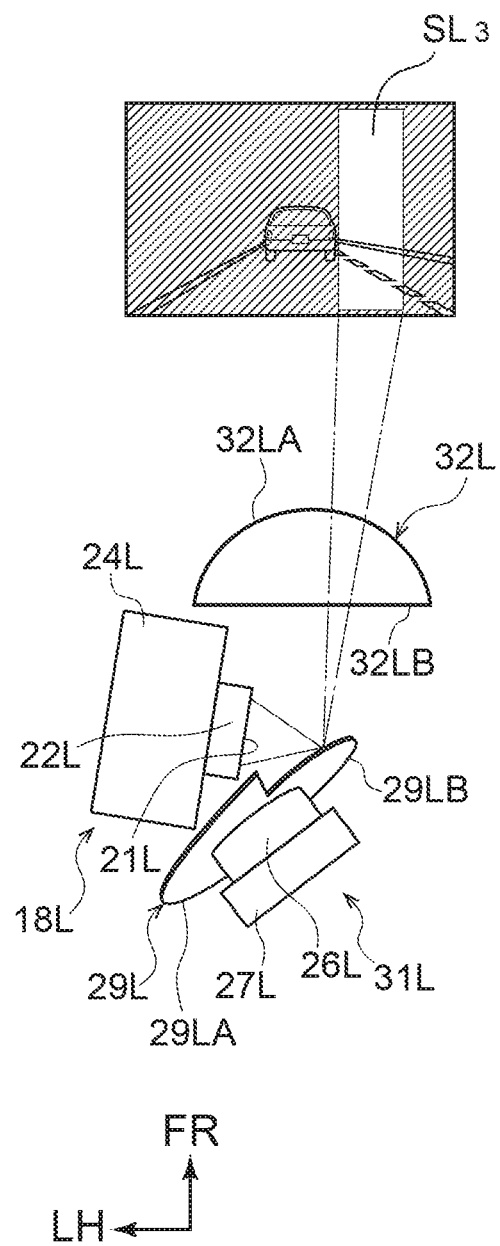

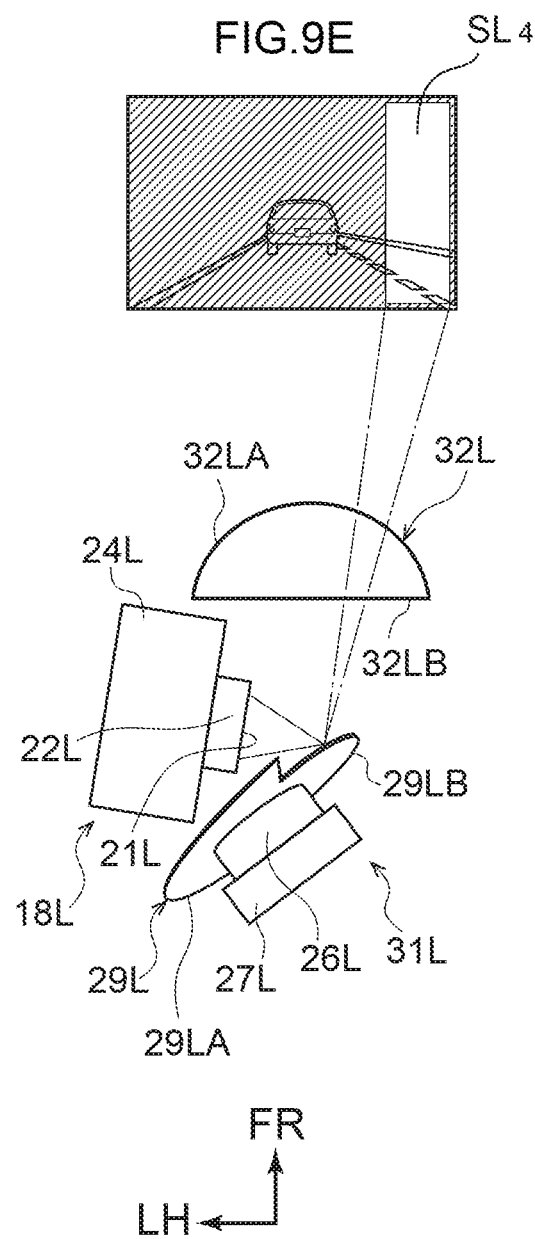

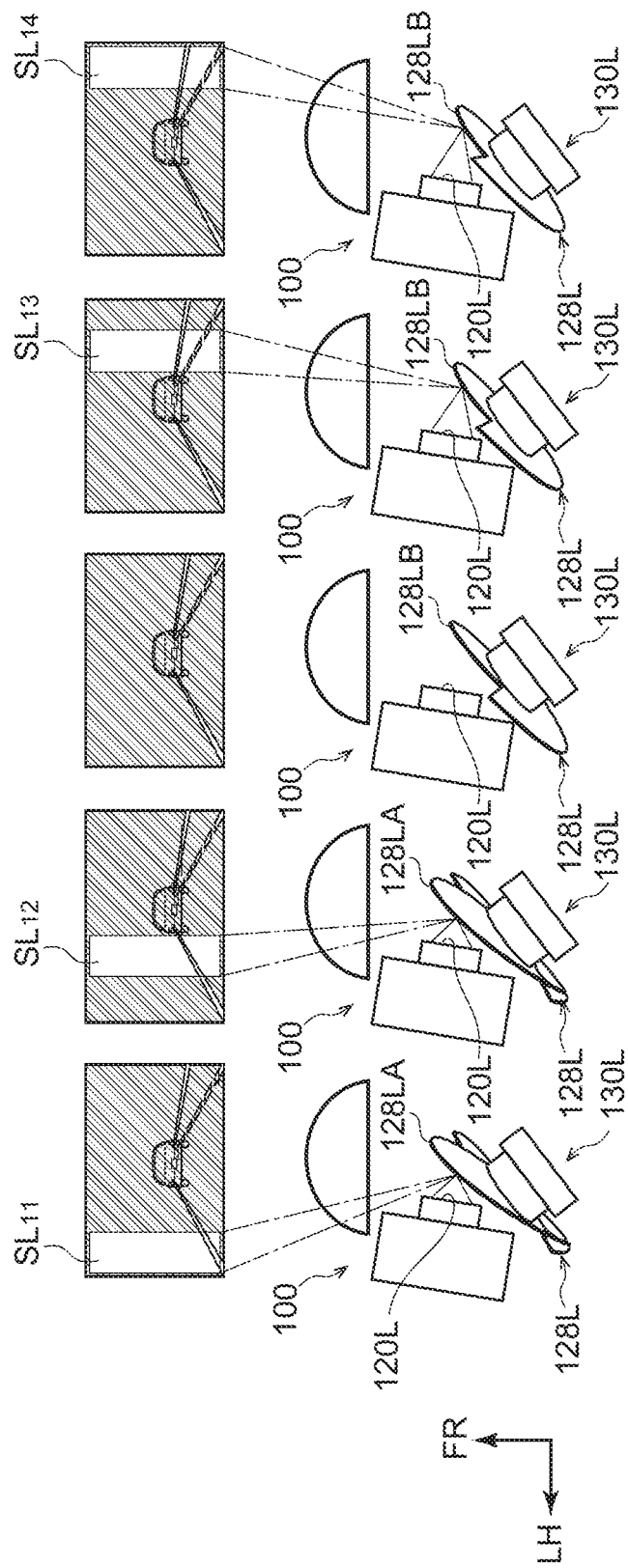

VEHICLE FRONT HEADLIGHT DEVICE

CROSS-REFERENCE TO RELATED APPLICATION

This application claims priority under 35 USC 119 from Japanese Patent Application No. 2018-222820, filed Nov. 28, 2018, the disclosure of which is incorporated by reference herein.

BACKGROUND

Technical Field

The present disclosure relates to a vehicle front headlight device.

Related Art

A related vehicle lighting device includes a movable reflector including a reflective surface and configured capable of rotating, a light source that shines light onto the reflective surface of the movable reflector, and a projection lens that focuses reflected light emitted from the light source and reflected by the reflective surface of the movable reflector, and emits this reflected light toward the front (see, for example, Japanese Patent Application Laid-Open (JP-A) No. 2014-216049).

In such a vehicle lighting device, the light source emits light in a linear shape, and the movable reflector reflects the emitted light while rotating, enabling the orientation of (position illuminated by) the reflected light to be changed. Thus, in such a vehicle lighting device, switching off the light source at a predetermined timing enables a linear non-illuminated region to be formed in a portion of a light distribution region.

However, when the non-illuminated region is formed in a linear shape, the non-illuminated region formed includes a portion of the light distribution region that requires illumination with light. There is accordingly still room for improvement for configurations in which light is shone at parts of the light distribution region that require illumination with light, or in other words, configurations in which a non-illuminated region is only formed in a portion that does not require illumination with light.

SUMMARY

The present disclosure provides a vehicle front headlight device that may reduce the range of a non-illuminated region of a light distribution region.

A first aspect of the present disclosure is a vehicle front headlight device including a first front headlight and a second front headlight configuring a left and right pair, each including a light source configured to emit light, a rotating mirror configured to reflect light emitted from the light source while rotating, and a lens configured to allow light reflected by the rotating mirror to pass through and shine ahead of a vehicle; and a controller configured to control switching ON and OFF of the respective light sources and rotational drive of the respective rotating mirrors of the first front headlight and the second front headlight, such that, in a light distribution region formed by illumination of the first front headlight and the second front headlight, a first non-illuminated region that is not illuminated by the first front headlight is illuminated by the second front headlight, and a second non-illuminated region that is not illuminated by the second front headlight is illuminated by the first front headlight.

According to the first aspect of the present disclosure, the controller controls switching ON and OFF of the respective light sources and rotational drive of the respective rotating mirrors of the first front headlight and the second front headlight, such that in the light distribution region formed by illumination by the first front headlight and the second front headlight configuring a left and right pair, the first non-illuminated region that is not illuminated by the first front headlight is illuminated by the second front headlight, and the second non-illuminated region that is not illuminated by the second front headlight is illuminated by the first front headlight. Accordingly, the vehicle front headlight device of the first aspect may reduce the range of the non-illuminated region in the light distribution region formed by illumination by the first front headlight and the second front headlight.

In a second aspect of the present disclosure, in the first aspect, the controller may be configured to control switching ON and OFF of the respective light sources and rotational drive of the respective rotating mirrors of the first front headlight and the second front headlight, so as to form a third non-illuminated region that is illuminated by neither the first front headlight nor the second front headlight in a light distribution region formed by illumination by the first front headlight and the second front headlight.

According to the second aspect of the present disclosure, the controller controls switching ON and OFF of the respective light sources and rotational drive of the respective rotating mirrors of the first front headlight and the second front headlight so as to form the third non-illuminated region that is illuminated by neither the first front headlight nor the second front headlight in the light distribution region formed by illumination by the first front headlight and the second front headlight. Namely, in the second aspect of the present disclosure, a non-illuminated region is only formed at a portion of the light distribution region formed by illumination by the first front headlight and the second front headlight in which there is no need to illuminate light. Accordingly, the vehicle front headlight device of the second aspect may reduce the range of the non-illuminated region in the light distribution region.

A third aspect of the present disclosure, in the above second aspect, may further include a recognition section configured to recognize a leading vehicle, the controller may be configured to form the third non-illuminated region with respect to the leading vehicle recognized by the recognition section.

According to the third aspect of the present disclosure, the controller forms the third non-illuminated region with respect to the leading vehicle recognized by the recognition section. Accordingly, the vehicle front headlight device of the third aspect may suppress the driver and the like of the leading vehicle from being dazzled.

According to the above aspects, the vehicle front headlight device of the present disclosure may reduce the range of a non-illuminated region in a light distribution region.

BRIEF DESCRIPTION OF THE DRAWINGS

Exemplary embodiments will be described in detail based on the following figures, wherein:

FIG. 2B is an explanatory diagram schematically illustrating an illuminated sub-region $SR_2$ illuminated by the right front headlight according to the first exemplary embodiment;

FIG. 2C is an explanatory diagram schematically illustrating an illuminated sub-region $SR_3$ illuminated by the right front headlight according to the first exemplary embodiment;

FIG. 2D is an explanatory diagram schematically illustrating an illuminated sub-region $SR_4$ illuminated by the right front headlight according to the first exemplary embodiment;

FIG. 4C is an explanatory diagram schematically illustrating an illuminated sub-region $SL_3$ illuminated by the left front headlight according to the first exemplary embodiment;

FIG. 4D is an explanatory diagram schematically illustrating an illuminated sub-region $SL_4$ illuminated by the left front headlight according to the first exemplary embodiment;

FIG. 7A is an explanatory diagram schematically illustrating an illuminated sub-region $SR_1$ illuminated by a right front headlight according to a second exemplary embodiment;

FIG. 7C is an explanatory diagram schematically illustrating an illuminated sub-region $SR_2$ illuminated by the right front headlight according to a second exemplary embodiment;

FIG. 7E is an explanatory diagram schematically illustrating an illuminated sub-region $SR_4$ illuminated by the right front headlight according to a second exemplary embodiment;

FIG. 9A is an explanatory diagram schematically illustrating an illuminated sub-region $SL_1$ illuminated by a left front headlight according to the second exemplary embodiment;

FIG. 9B is an explanatory diagram schematically illustrating an illuminated sub-region $SL_2$ illuminated by the left front headlight according to the second exemplary embodiment;

FIG. 9D is an explanatory diagram schematically illustrating an illuminated sub-region $SL_3$ illuminated by a left front headlight according to the second exemplary embodiment;

FIG. 9E is an explanatory diagram schematically illustrating an illuminated sub-region $SL_4$ illuminated by a left front headlight according to the second exemplary embodiment:

FIG. 12A is an explanatory diagram schematically illustrating illuminated sub-regions formed by front headlights according to a comparative example.

DETAILED DESCRIPTION

Figure 1:
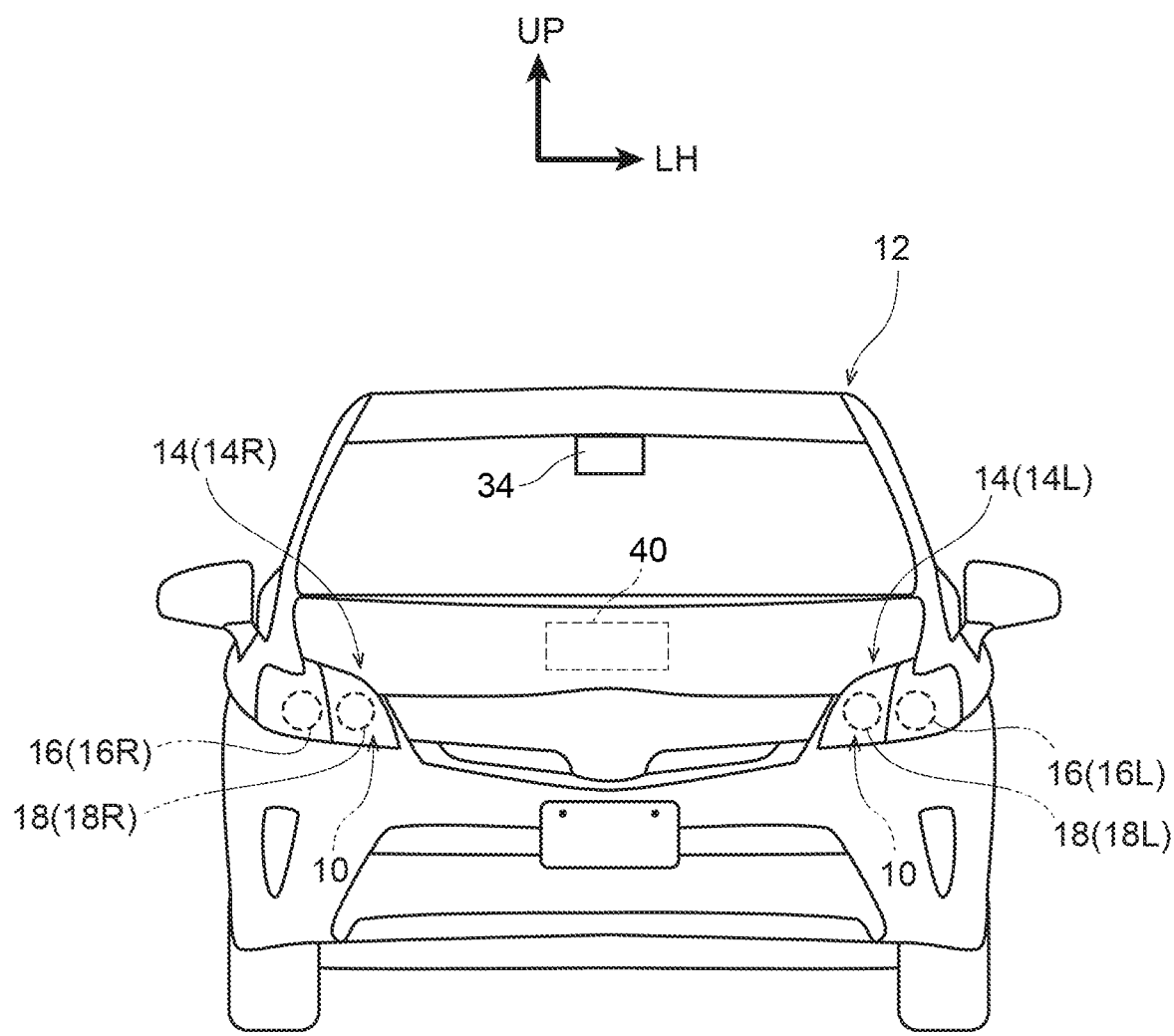
FIG. 1 is a front view illustrating a vehicle provided with a vehicle front headlight device according to an exemplary embodiment.

Detailed explanation follows regarding exemplary embodiments of the present disclosure, with reference to the drawings. To assist explanation, in the drawings the arrow UP indicates a vehicle upper side, the arrow FR indicates a vehicle front side, and the arrow LH indicates a vehicle left side, as appropriate. In the following explanation, unless indicated otherwise, reference to up, down, front, rear, left, and right directions refers to up and down in a vehicle vertical direction, front and rear in a vehicle front-rear direction, and left and right in a vehicle left-right direction (vehicle width direction).

As illustrated in FIG. 1, a vehicle 12 is provided with a pair of left and right headlamp units 14 to secure a field of view ahead of the vehicle 12. Namely, a headlamp unit 14R is disposed on the right of a front end section of the vehicle 12, and a headlamp unit 14L is disposed on the left of the front end section of the vehicle 12.

The headlamp units 14R, 14L are configured with left-right symmetry to each other in the vehicle width direction, and are configured including low beam units 16 (16R, 16L) disposed at the vehicle width direction outer side, and high beam units 18 (18R, 18L) disposed at the vehicle width direction inner side. The low beam units 16 each shine light (visible light) through a lens (not illustrated in the drawings) onto a low beam light distribution area (not illustrated in the drawings) on the road (road surface) ahead of the vehicle 12.

The high beam units 18 shine light (visible light) through lenses 32 (32R, 32L: see FIG. 2A to FIG. 5, etc.), described later, onto a high beam light distribution area Ha (see FIG. 6 etc.), serving as a light distribution region, further ahead and at the upper side of the low beam light distribution area illuminated by the low beam units 16.

Note that a vehicle front headlight device 10 according to each exemplary embodiment is applied to the left and right pair of high beam units 18. Namely, the right high beam unit 18R corresponds to a "first front headlight", and the left high beam unit 18L corresponds to a "second front headlight". In the following explanation, the reference numerals (numbers) are suffixed with the letter "R" or "L" to distinguish between components on the right and left.

First Exemplary Embodiment

As illustrated in FIG. 2A to FIG. 5, the left and right pair of high beam units 18R, 18L applied with the vehicle front headlight device 10 according to a first exemplary embodiment respectively include light sources 20R, 20L that emit light (visible light), rotating mirrors 30R, 30L that reflect the light emitted from the light sources 20R, 20L, and the single lenses 32R, 32L that allow the light reflected by the rotating mirrors 30R, 30L to pass through to be shone (projected) ahead of (to the exterior of) the vehicle 12.

The light sources 20R, 20L are each configured by plural (for example, six) light emitting diodes (LEDs) that are arranged on substrates 22R, 22l, so as to form a single row with no gaps present between the respective LEDs, and are capable of being individually switched ON and OFF. The substrates 22R, 22L are respectively disposed on heat sinks 24R, 24L. The respective light sources 20R, 20L (the respective LEDs) are electrically connected to a controller 40 (see FIG. 1), and the light sources 20R, 20L are switched on and off not only by switch operation by a driver, but also under the control of the controller 40.

Front surfaces of the respective lenses 32R, 32L are configured by convex semispherical curved surfaces 32RA, 32LA. Rear surfaces of the lenses 32R, 32L are respectively configured by flat surfaces 32RB, 32LB. Light that has been reflected by the rotating mirrors 30R, 30L and incident to the rear surfaces (flat surfaces 32RB, 32LB) of the lenses 32R, 32L passes through the lenses 32R, 32L and is emitted (shone) ahead of the vehicle from the front surfaces (curved surfaces 32RA, 32LA) of the lenses 32R, 32L. In the interests of simplicity, the drawings do not illustrate diffraction of the light by the lenses 32R, 32L. The rear surfaces of the lenses 32R, 32L are not limited to the flat surfaces 32RB, 32LB.

The rotating mirrors 30R, 30L are each configured by plural mirror bodies 28R, 28L, each of which is inclined at a predetermined angle with respect to the axial directions of a corresponding shaft 26R, 26L. The mirror bodies 28R, 28L are disposed at uniform intervals around the peripheral directions of the shafts 26R, 26L. The rotating mirrors 30R, 30L according to the present exemplary embodiment are each provided with two of the mirror bodies 28R, 28L, each of which has a substantially semicircular profile as viewed along the axial direction.

Namely, as illustrated in FIG. 2A to FIG. 2D, the right rotating mirror 30R includes a first mirror body 28RA and a second mirror body 28RB, each of which has a reflective surface with a curvature that, when rotated, is capable of reflecting light toward the right from the lower side to the upper side (such that a first non-illuminated region DaR, described later, is formed on an upper front left side).

Moreover, as illustrated in FIG. 4A to FIG. 4D, the left rotating mirror 30L includes a first mirror body 28LA and a second mirror body 28LB, each of which has a reflective surface with a curvature that, when rotated, reflects light toward the left from the lower side to the upper side (such that a second non-illuminated region DaL, described later, is formed on an upper front right side).

As illustrated in FIG. 2A to FIG. 5, the rotating mirrors 30R, 30L are capable of being rotationally driven in one direction about the respective shafts 26R, 26L. Namely, the rotating mirrors 30R, 30L have fan-like structures in which the respective shafts 26R, 26L are rotationally driven in the one direction by respective motors 27R, 27L. The motors 27R, 27L are electrically connected to the controller 40, and the rotating mirrors 30R, 30L are rotationally driven not only by switch operation by the driver, but also under the control of the controller 40.

Figure 5:
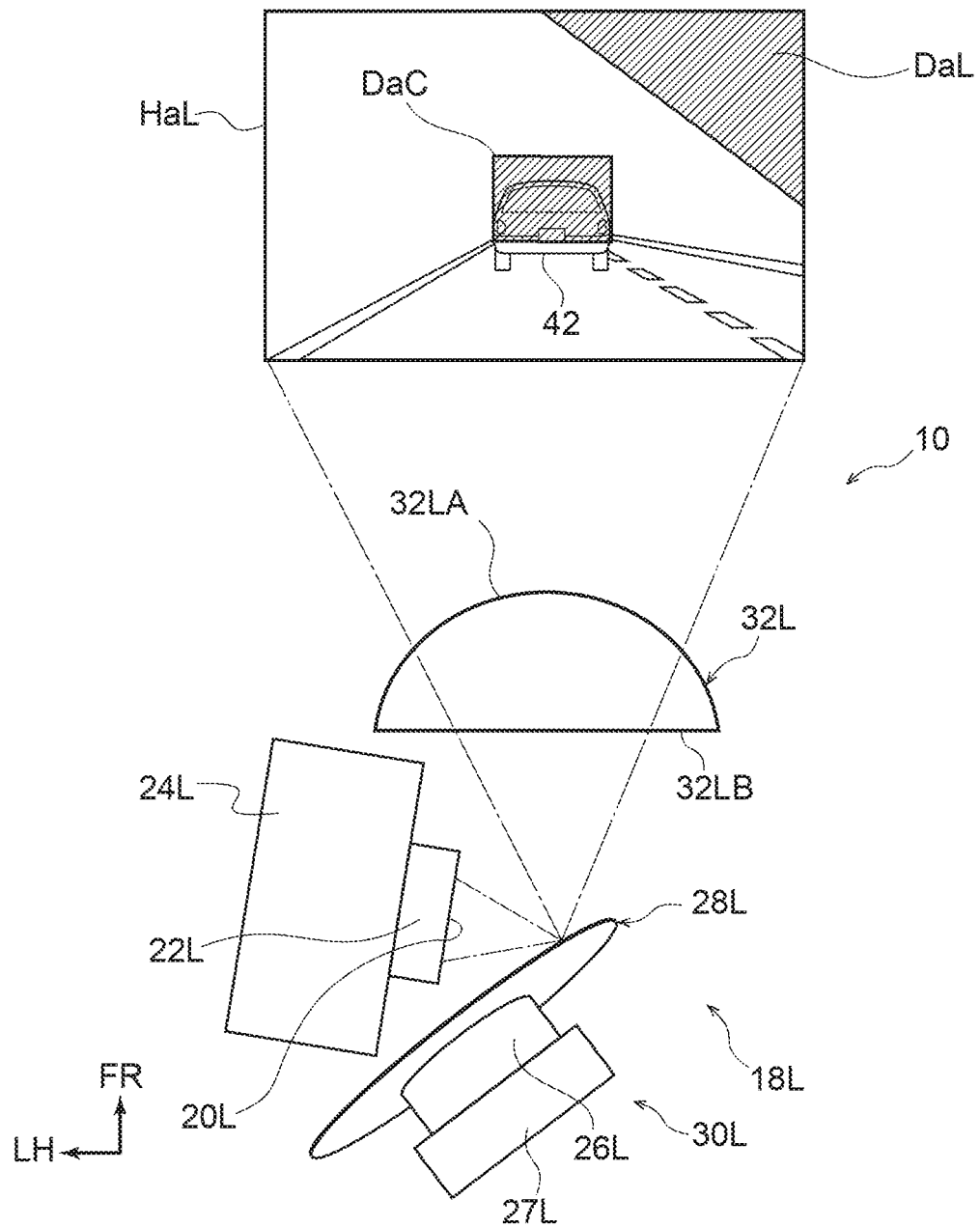
FIG. 5 is an explanatory diagram illustrating a second illuminated region, a second non-illuminated region, and a third non-illuminated region formed by a left front headlight according to the first exemplary embodiment.
Figure 6:
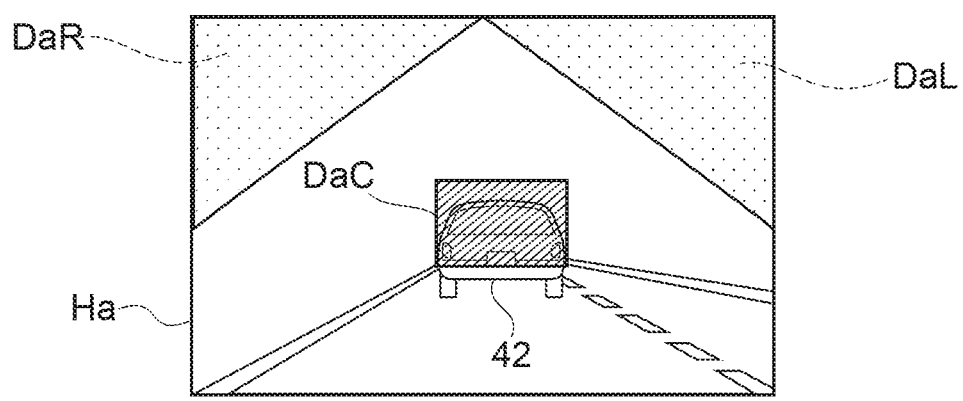
FIG. 6 is an explanatory diagram illustrating a high beam light distribution area including a third non-illuminated region, formed by left and right front headlights according to the first exemplary embodiment.

As illustrated in FIG. 6, the high beam light distribution area Ha is formed by superimposing a first illuminated region HaR (see FIG. 3) of light shone by the right high beam unit 18R, and a second illuminated region HaL (see FIG. 5) of light shone by the left high beam unit 18L.

First, explanation is given regarding the first illuminated region HaR (see FIG. 3) formed by light (hereafter sometimes referred to as "reflected light") reflected by the rotating mirror 30R of the right high beam unit 18R.

Figure 2A:
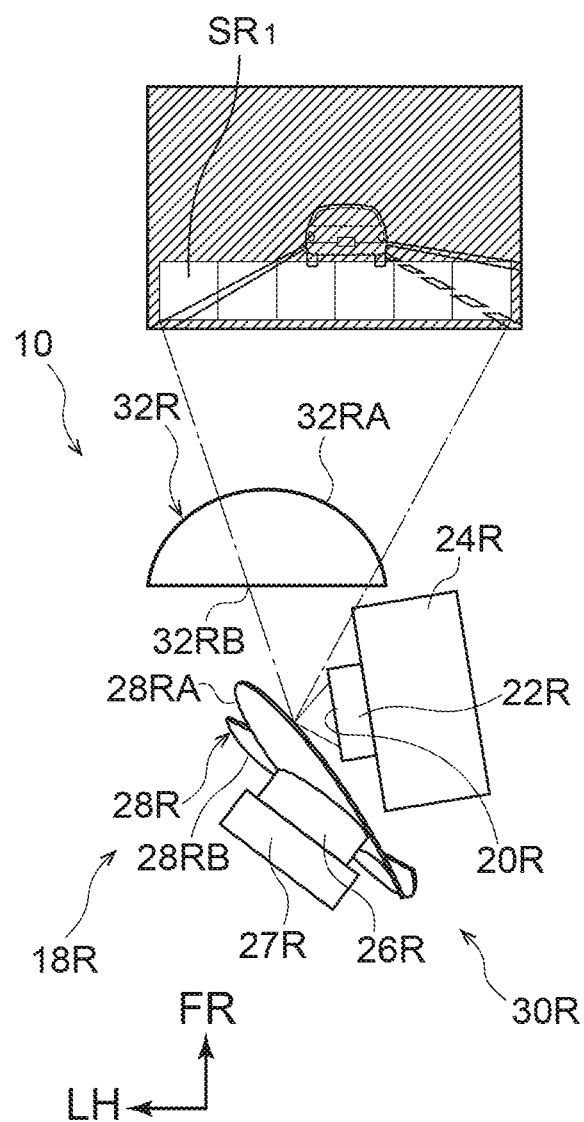
FIG. 2A is an explanatory diagram schematically illustrating an illuminated sub-region $SR_1$ illuminated by a right front headlight according to a first exemplary embodiment.

As illustrated in FIG. 2A, an illuminated sub-region SRl is formed by reflected light (visible light) that is light emitted from the light source 20R and reflected by the first mirror body 28RA when stationary at a predetermined first stationary position, for example. The illuminated sub-region $SR_1$ has a rectangular shape with its length direction along the left-right direction, and is formed at a lower end position ahead of the vehicle 12.

As illustrated in FIG. 2B, an illuminated sub-region $SR_2$ is formed by reflected light that is light emitted from the light source 20R and reflected by the first mirror body 28RA when stationary at a second stationary position in a state rotated by, for example, 90° from the first stationary position. The illuminated sub-region $SR_2$ has a rectangular shape with its length direction along the left-right direction, and is formed at a position shifted by a predetermined height toward the upper side from the lower end toward a lower-central position ahead of the vehicle 12.

Note that at this point, parts of the light source 20R (some of the six LEDs) are switched OFF under the control of the controller 40. Accordingly, Non-illuminated regions where light is not shone are formed at a left end portion and a substantially left-right direction central portion (a portion where a leading vehicle 42 is present) of the lower-central position ahead of the vehicle 12.

As illustrated in FIG. 2C, an illuminated sub-region $SR_3$ is formed by reflected light that is light emitted from the light source 20R and reflected by the second mirror body 28RB when stationary at a third stationary position in a state rotated by a further 90° from the second stationary position (180° from the first stationary position). The illuminated sub-region $SR_3$ has a rectangular shape with its length direction along the left-right direction, and is formed at a position shifted by a predetermined height toward the upper side from the lower-central position to an upper-central position ahead of the vehicle 12.

Note that at this point, parts of the light source 20R (some of the six LEDs) are switched off under the control of the controller 40. Accordingly, Non-illuminated regions where light is not shone are formed at a left end portion, and at a left side portion adjacent to the left end portion, of the upper-central position ahead of the vehicle 12.

As illustrated in FIG. 2D, an illuminated sub-region $SR_4$ is formed by reflected light that is light emitted from the light source 20R and reflected by the second mirror body 28RB when stationary at a fourth stationary position in a state rotated by a further 90° from the third stationary position (270° from the first stationary position). The illuminated sub-region $SR_4$ has a rectangular shape with its length direction along the left-right direction, and is formed at an upper end position ahead of the vehicle 12.

Note that at this point, half of the light source 20R (three contiguous LEDs) are switched OFF under the control of the controller 40. Accordingly, a non-illuminated region where light is not shone is formed in a portion corresponding to the left half of the upper end position ahead of the vehicle 12.

When the second mirror body 28RB is rotated a further 90° from the fourth stationary position (360° from the first stationary position), the rotating mirror 30R returns to its original state as illustrated in FIG. 2A, and light is reflected by the first mirror body 28RA again.

Namely, as the mirror bodies 28R of the right rotating mirror 30R undergo one full revolution, a shift occurs from the lower end position toward a right side upper end position ahead of the vehicle 12 via the rectangular illuminated sub-regions $SR_1$, $SR_2$, $SR_3$, $SR_4$, each having a length direction along the left-right direction. Accordingly, continuously rotating the rotating mirror 30R (mirror bodies 28R) at a predetermined speed or greater (for example at 200 Hz) results in consecutive high-speed shifts through the illuminated sub-regions $SR_1$, $SR_2$, $SR_3$, $SR_4$ from the lower end position toward the right side upper end position ahead of the vehicle 12.

Figure 3:
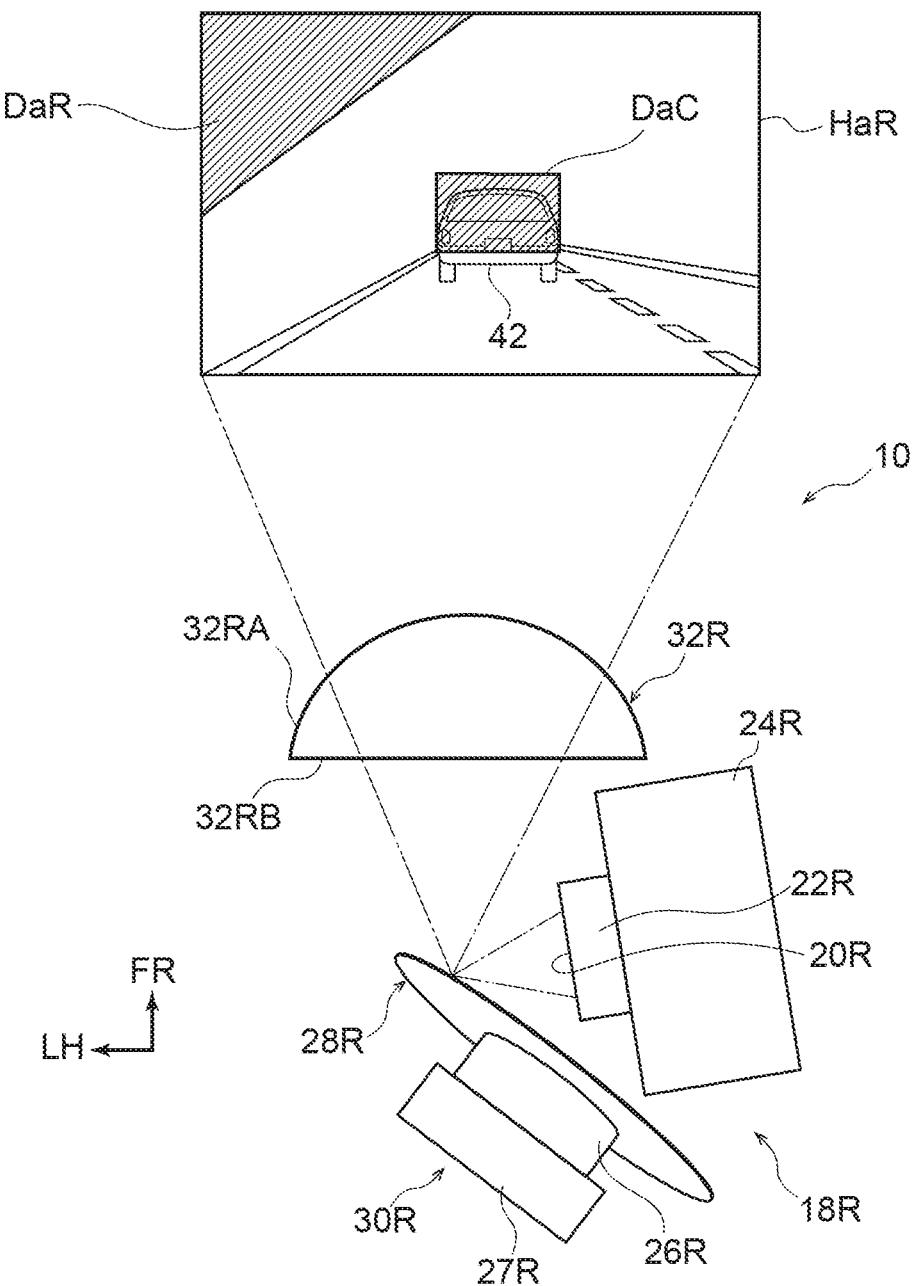
FIG. 3 is an explanatory diagram illustrating a first illuminated region, a first non-illuminated region, and a third non-illuminated region formed by a right front headlight according to the first exemplary embodiment.

Accordingly, as illustrated in FIG. 3, due to the afterimage effect of the light, to the human eye, the substantially trapezoidal first illuminated region HaR appears ahead of the vehicle 12. The length direction of the first illuminated region HaR runs along the left-right direction, head of the occupant first illuminated region HaR is formed with the substantially right-angled triangular first non-illuminated region DaR at the upper front left side, and formed with a rectangular third non-illuminated region DaC at a position corresponding to the leading vehicle 42.

Explanation next follows regarding the second illuminated region HaL (see FIG. 5) formed by light (reflected light) reflected by the rotating mirror 30L of the left high beam unit 18L.

Figure 4A:
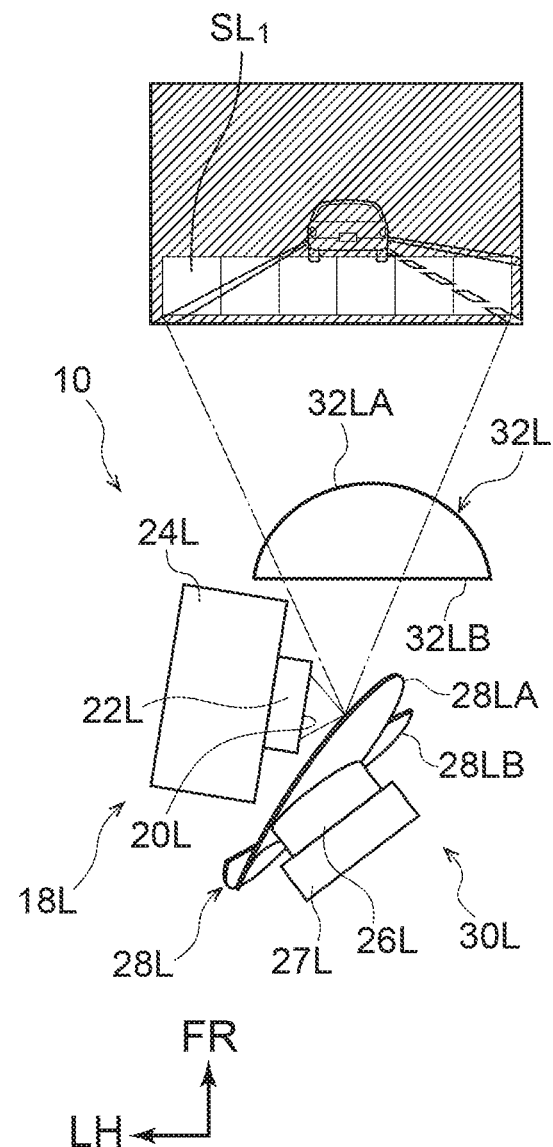
FIG. 4A is an explanatory diagram schematically illustrating an illuminated sub-region $SL_1$ illuminated by a left front headlight according to the first exemplary embodiment.

As illustrated in FIG. 4A, an illuminated sub-region $SL_1$ is formed by reflected light (visible light) that is light emitted from the light source 20L and reflected by the first mirror body 28LA when stationary at a predetermined first stationary position, for example. The illuminated sub-region $SL_1$ has a rectangular shape with its length direction along the left-right direction, and is formed at the lower end position ahead of the vehicle 12.

Figure 4B:
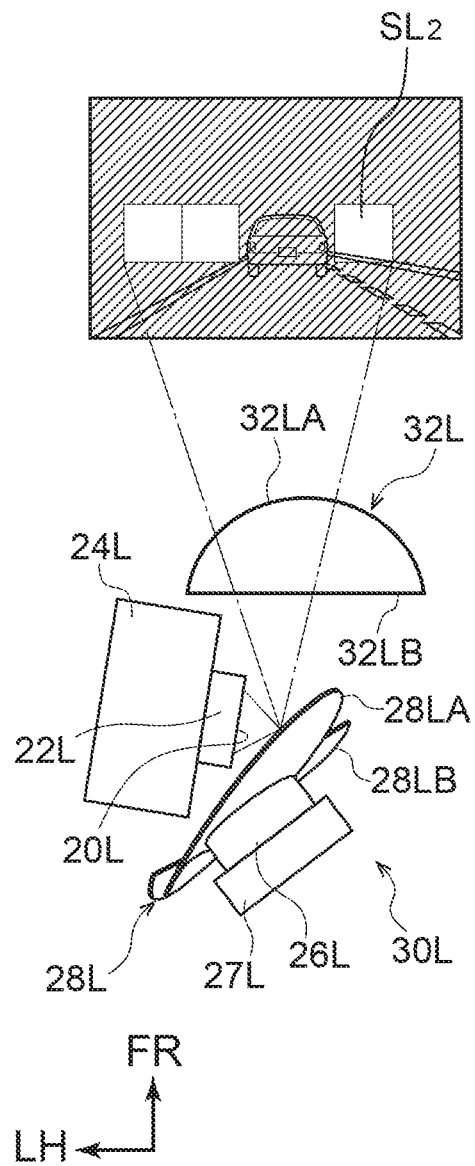
FIG. 4B is an explanatory diagram schematically illustrating an illuminated sub-region $SL_2$ illuminated by the left front headlight according to the first exemplary embodiment.

As illustrated in FIG. 4B, an illuminated sub-region $SL_2$ is formed by reflected light that is light emitted from the light source 20L and reflected by the first mirror body 28LA when stationary at a second stationary position in a state rotated by, for example, 90° from the first stationary position. The illuminated sub-region $SL_2$ has a rectangular shape with its length direction along the left-right direction, and is formed at a position shifted by a predetermined height toward the upper side from the lower end position toward the lower-central position ahead of the vehicle 12.

Note that at this point, parts of the light source 20L (some of the six LEDs) are switched off under the control of the controller 40. Non-illuminated regions where light is not shone are thereby formed at a right end portion and a substantially left-right direction central portion (the portion where the leading vehicle 42 is present) of the lower-central position ahead of the vehicle 12.

As illustrated in FIG. 4C, an illuminated sub-region $SL_3$ is formed by reflected light that is light emitted from the light source 20L and reflected by the second mirror body 28LB when stationary at a third stationary position in a state rotated by a further 90° from the second stationary position (180° from the first stationary position). The illuminated sub-region $SL_3$ has a rectangular shape with its length direction along the left-right direction, and is formed at a position shifted by a predetermined height toward the upper side from the lower-central position to the upper-central position ahead of the vehicle 12.

Note that at this point, parts of the light source 20L (some of the six LEDs) are switched OFF under the control of the controller 40. Non-illuminated regions where light is not shone are thereby formed at a right end portion, and at a right side portion adjacent to the right end portion, of the upper-central position ahead of the vehicle 12.

As illustrated in FIG. 4D, an illuminated sub-region $SL_4$ is formed by reflected light that is light emitted from the light source 20L and reflected by the second mirror body 28LB when stationary at a fourth stationary position in a state rotated by a further 90° from the third stationary position (270° from the first stationary position). The illuminated sub-region $SL_4$ has a rectangular shape with its length direction along the left-right direction, and is formed at the upper end position ahead of the vehicle 12.

Note that at this point, half of the light source 20L (three contiguous LEDs) are switched OFF under the control of the controller 40. Accordingly, a non-illuminated region where light is not shone is formed in a portion corresponding to the right half of the upper end position ahead of the vehicle 12.

When the second mirror body 28LB is rotated a further 90° from the fourth stationary position (360° from the first stationary position), the rotating mirror 30L returns to its original state as illustrated in FIG. 4A, and light is reflected by the first mirror body 28LA again.

Namely, as the mirror bodies 28L of the left rotating mirror 30L undergo one full revolution, a shift occurs from the lower end position toward the left side upper end position ahead of the vehicle 12 via the rectangular illuminated sub-regions $SL_1$, $SL_2$, $SL_3$, $SL_4$, each having a length direction along the left-right direction. Accordingly, continuously rotating the rotating mirror 30L (mirror bodies 28L) at a predetermined speed or greater (for example at 200 Hz) results in consecutive high-speed shifts through the illuminated sub-regions $SL_1$, $SL_2$, $SL_3$, $SL_4$ from the lower end position toward the left side upper end position ahead of the vehicle 12.

Accordingly, as illustrated in FIG. 5, due to the afterimage effect of the light, to the human eye, the substantially trapezoidal second illuminated region HaL appears ahead of the vehicle 12. The length direction of the second illuminated region HaL runs along the left-right direction, and the second illuminated region HaL is formed with the substantially right-angled triangular second non-illuminated region DaL at the upper front right side, and formed with the rectangular third non-illuminated region DaC at a position corresponding to the leading vehicle 42.

In the high beam light distribution area Ha, the first illuminated region HaR illuminated by the right high beam unit 18R and the second illuminated region HaL illuminated by the left high beam unit 18L are superimposed on each other. Thus, as illustrated in FIG. 6, in the high beam light distribution area Ha formed, the third non-illuminated region DaC is the only non-illuminated region.

Namely, in the high beam light distribution area Ha, the first non-illuminated region DaR in the first illuminated region HaR is illuminated by the second illuminated region HaL, and the second non-illuminated region DaL in the second illuminated region HaL is illuminated by the first illuminated region HaR. Naturally, the light intensity at the portions illuminated by only the first illuminated region HaR or the second illuminated region HaL is lower than the light intensity at portions where the first illuminated region HaR and the second illuminated region HaL are superimposed on each other.

As illustrated in FIG. 1, a recognition device 34 such as a camera or a sensor that detects the situation in the surroundings of the vehicle 12 is provided at a vehicle width direction central portion of an upper end portion at the inner side of a front windshield of the vehicle 12. A detection device (not illustrated in the drawings), such as radar that detects the situation in the surroundings of the vehicle 12, is provided at the inner side of a front grille of the vehicle 12. The recognition device 34 and the detection device are both electrically connected to the controller 40.

The recognition device 34 and the detection device configure a "recognition unit" of the present exemplary embodiment. The recognition device 34 and the detection device recognize a leading vehicle 42 (see FIG. 3, FIG. 5, and FIG. 6) traveling ahead of the vehicle 12. The controller 40 adjusts the timings at which the respective LEDs of the light sources 20R, 20L are switched OFF and switched ON according to the distance to the leading vehicle 42 (the position of the leading vehicle 42 relative to the vehicle 12) as recognized by the recognition device 34 and the detection device.

Explanation follows regarding operation of the vehicle front headlight device 10 according to the first exemplary embodiment configured as described above.

When the vehicle 12 is traveling at night or the like, the high beam is switched ON as required. Namely, the driver operates a switch to drive rotation of the rotating mirrors 30R, 30L and switch on the light sources 20R, 20L, or the controller 40 drives rotation of the rotating mirrors 30R, 30L and switches ON the light sources 20R, 20L based on information detected by the recognition device 34 and the like provided to the vehicle 12.

When this is performed, light (visible light) emitted from the light source 20R is reflected by the rotation-driven rotating mirror 30R (the first mirror body 28RA and the second mirror body 28RB), passes through the lens 32R, and is shone ahead of the vehicle. The first illuminated region HaR is thus formed ahead of the vehicle 12 (see FIG. 3).

Moreover, light (visible light) emitted from the light source 20L is reflected by the rotation-driven rotating mirror 30L (the first mirror body 28LA and the second mirror body 28LB), passes through the lens 32L, and is shone ahead of the vehicle. The second illuminated region HaL is thus formed ahead of the vehicle 12 (see FIG. 5).

The first illuminated region HaR formed by the high beam unit 18R and the second illuminated region HaL formed by the high beam unit 18L are superimposed on each other to form the high precision high beam light distribution area Ha (see FIG. 6) that is configured further ahead and at the upper side of the low beam light distribution area.

Figure 12B:
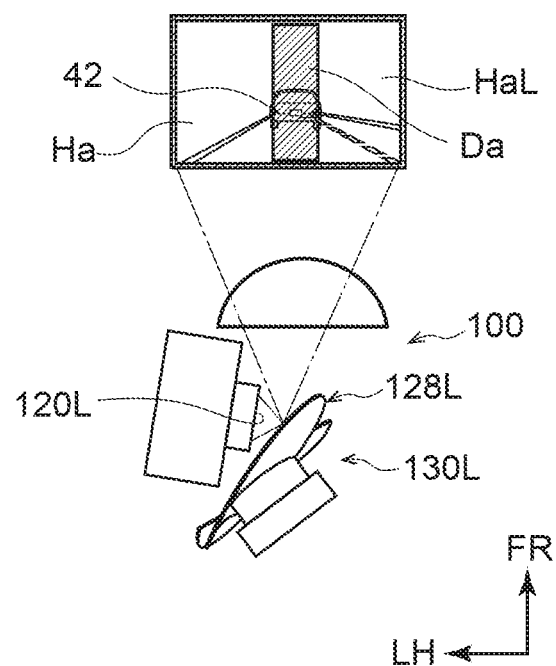
FIG. 12B is an explanatory diagram illustrating a high beam light distribution area formed by front headlights according to the comparative example.

Explanation follows regarding a vehicle front headlight device 100 according to a comparative example, illustrated in FIG. 12A and FIG. 12B. In the vehicle front headlight device 100 according to the comparative example, a first illuminated region HaR shone by a right high beam unit 18R and a second illuminated region HaL shone by a left high beam unit 18L have the same shape as each other. Thus, explanation follows regarding the left high beam unit 18L only.

As illustrated in FIG. 12A, an illuminated sub-region $SL_1$ is formed by reflected light (visible light) that is light emitted from a light source 120L and reflected by a first mirror body 128LA when stationary at a predetermined first stationary position, for example. The illuminated sub-region $SL_{11}$ has a rectangular shape with its length direction along the vertical direction, and is formed at a predetermined left end position ahead of the vehicle 12.

An illuminated sub-region $SL_{12}$ is formed by reflected light that is light emitted from the light source 120L and reflected by the first mirror body 128LA when stationary at a second stationary position in a state rotated by, for example, 72° from the first stationary position. The illuminated sub-region $SL_{12}$ has a rectangular shape with its length direction along the vertical direction, and is formed at a position shifted toward the right from the predetermined left end position ahead of the vehicle 12.

Light is not reflected by the first mirror body 128LA or a second mirror body 128LB when stationary at a third stationary position in a state rotated by a further 72° from the second stationary position (144° from the first stationary position). Namely, the light source 120L (every LED) is switched OFF when at the third stationary position.

An illuminated sub-region $SL_{13}$ is then formed by reflected light that is light emitted from the light source 120L and reflected by the second mirror body 128LB when stationary at a fourth stationary position in a state rotated by a further 72° from the third stationary position (216° from the first stationary position). The illuminated sub-region $SL_{13}$ has a rectangular shape with its length direction along the vertical direction, and is formed at a position shifted toward the right side of a central position ahead of the vehicle 12.

An illuminated sub-region $SL_{14}$ is formed by reflected light that is light emitted from the light source 120L and reflected by the second mirror body 128LB when stationary at a fifth stationary position in a state rotated by a further 72° from the fourth stationary position (288° from the first stationary position). The illuminated sub-region $SL_{14}$ has a rectangular shape with its length direction along the vertical direction, and is formed at a predetermined right end position ahead of the vehicle 12.

When the second mirror body 128LB is rotated a further 72° from the fifth stationary position (360° from the first stationary position), the rotating mirror 130L returns to its original state, and light is reflected by the first mirror body 128LA again.

Namely, as the mirror bodies 128L of the rotating mirror 130L undergo one full revolution, a shift occurs from one end to the other (from left to right) in the vehicle width direction ahead of the vehicle 12 via the rectangular illuminated sub-regions $SL_{11}$, $SL_{12}$, $SL_{13}$, $SL_{14}$, each having a length direction along the vertical direction. Accordingly, continuously rotating the rotating mirror 130L (mirror bodies 128L) at a predetermined speed or greater (for example at 200 Hz) results in consecutive high-speed shifts through the illuminated sub-regions $SL_{11}$, $SL_{12}$, $SL_{13}$, $SL_{14}$ from one end to the other (from left to right) in the vehicle width direction ahead of the vehicle 12.

Accordingly, as illustrated in FIG. 12B, due to the after-image effect of the light, to the human eye, a substantially rectangular second illuminated region HaL with its length direction along the vehicle width direction appears ahead of the vehicle 12. Namely, a high beam light distribution area Ha appears including a non-illuminated region Da with its length in the vertical direction at a left-right direction central portion that includes a location where a leading vehicle 42 is present.

In order to improve visibility for the driver driving the vehicle 12, it is important to provide illumination at the nearside of the leading vehicle 42 and further ahead than the leading vehicle 42. However, as illustrated in FIG. 12B, the vehicle front headlight device 100 according to the comparative example has the shortcoming that when the non-illuminated region Da is formed corresponding to the leading vehicle 42, the non-illuminated region Da is also formed at regions where illumination is important.

In contrast thereto, as illustrated in FIG. 6, with the vehicle front headlight device 10 according to the first exemplary embodiment, the first non-illuminated region DaR formed by the first illuminated region HaR is illuminated by the second illuminated region HaL, and the second non-illuminated region DaL formed by the second illuminated region HaL is illuminated by the first illuminated region HaR. This enables the range of a non-illuminated region in the high beam light distribution area Ha shone ahead of the vehicle 12 to be reduced.

Namely, in the vehicle front headlight device 10 according to the first exemplary embodiment, the non-illuminated region in the high beam light distribution area Ha can be confined to just the third non-illuminated region DaC corresponding to the leading vehicle 42. Thus, switching ON the high beam when the vehicle 12 is traveling at night or the like enables the visibility ahead of the vehicle to be improved for the driver of the vehicle 12. Moreover, the driver and the like of the leading vehicle 42 may be suppressed or prevented from being dazzled even when the high beam is switched on when the vehicle 12 is traveling at night or the like.

Note that the leading vehicle 42 is recognized by the recognition device 34 and the detection device provided to the vehicle 12, and based on the recognition result the controller 40 forms the third non-illuminated region DaC (the controller 40 adjusts the timings at which the respective LEDs of the light sources 20R, 20L, are switched OFF and ON to adjust the position of the third non-illuminated region DaC), such that the third non-illuminated region DaC does not diverge from the leading vehicle 42.

Moreover, since the upper front left side and the upper front right side of the high beam light distribution area Ha are only illuminated by either the first illuminated region HaR or the second illuminated region HaL, the light intensity is lower than at other portions of the high beam light distribution area Ha excluding the third non-illuminated region DaC (portions where the first illuminated region HaR and the second illuminated region HaL are superimposed).

However, since the upper front left side and the upper front right side of the high beam light distribution area Ha are regions where light would not be shone by a traditional high beam unit, illumination solely by either the first illuminated region HaR or the second illuminated region HaL is sufficient. Such a configuration enables some of the respective LEDs of the light sources 20R, 20L to be switched OFF when forming the first illuminated region HaR and the second illuminated region HaL, thereby enabling a reduction in energy consumed by the vehicle 12.

Second Exemplary Embodiment

Explanation follows regarding a vehicle front headlight device 10 according to a second exemplary embodiment. Locations equivalent to those of the first exemplary embodiment described above are allocated the same reference numerals, and detailed explanation thereof is omitted as appropriate.

Light sources 21R, 21L according to the second exemplary embodiment have a similar configuration to the light sources 20R, 20L of the first exemplary embodiment, but differ to the first exemplary embodiment in that their plural LEDs cannot be individually switched ON and OFF. Namely, the light sources 21R, 21L according to the second exemplary embodiment can only be switched ON and OFF as a row.

A right rotating mirror 31R is equivalent to the right rotating mirror 30R of the first exemplary embodiment, and includes a mirror body 29R configured by a first mirror body 29RA and a second mirror body 29RB, each of which has a reflective surface with a curvature that, when rotated, reflects light from the lower side to the upper side.

A left rotating mirror 31L is different from the left rotating mirror 30L of the first exemplary embodiment, and includes a mirror body 29L configured by a first mirror body 29LA and a second mirror body 29LB, each of which has a reflective surface with a curvature that, when rotated, is capable of reflecting light from the left to the right.

First, explanation is given regarding a first illuminated region HaR (see FIG. 8) formed by light (reflected light) reflected by the rotating mirror 31R of the right high beam unit 18R.

As illustrated in FIG. 7A, an illuminated sub-region $SR_1$ is formed by reflected light (visible light) that is light emitted from the light source 21R and reflected by the first mirror body 29RA when stationary at a predetermined first stationary position, for example. The illuminated sub-region $SR_1$ has a rectangular shape with its length direction along the left-right direction, and is formed at a lower end position ahead of the vehicle 12.

Figure 7B:
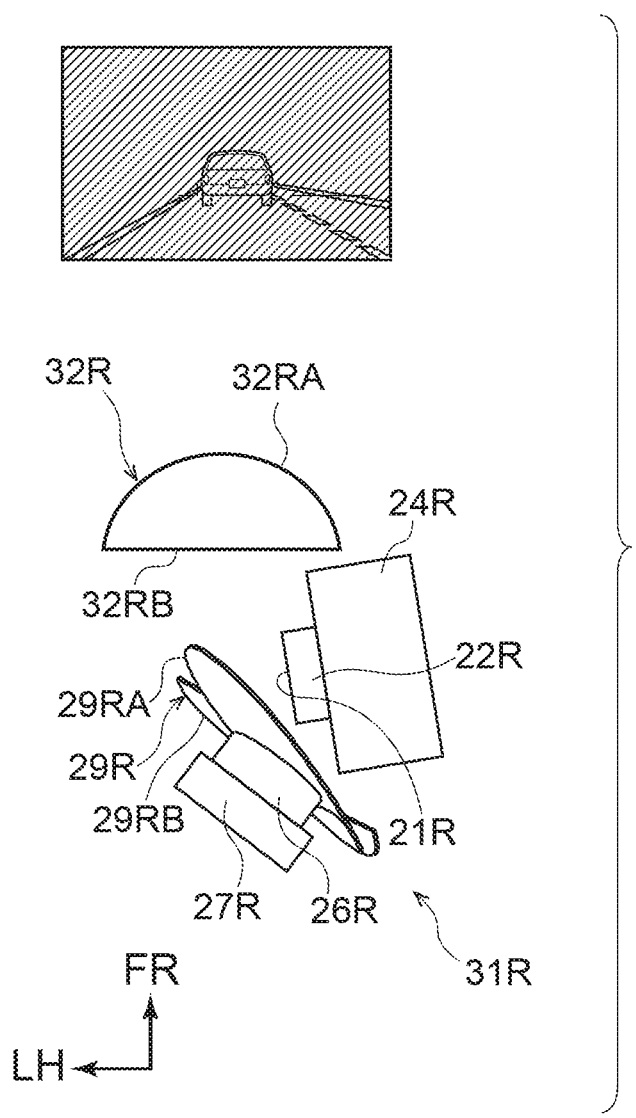
FIG. 7B is an explanatory diagram schematically illustrating a non-illuminated region according to a second exemplary embodiment.

As illustrated in FIG. 7B, light is not reflected by the first mirror body 29RA when stationary at a second stationary position in a state rotated by, for example, 72° from the first stationary position. Namely, the light source 21R is switched off under the control of the controller 40 when at the second stationary position. Accordingly, a non-illuminated region where light is not shone is formed at a position at a predetermined height (and including a portion where a leading vehicle 42 is present) ahead of the vehicle 12.

As illustrated in FIG. 7C, an illuminated sub-region $SR_2$ is then formed by reflected light that is light emitted from the light source 21R and reflected by the first mirror body 29RB when stationary at a third stationary position in a state rotated by a further 72° from the second stationary position (144° from the first stationary position). The illuminated sub-region $SR_2$ has a rectangular shape with its length direction along the left-right direction, and is formed at a position shifted by a predetermined height toward the upper side from the lower end position to a central position ahead of the vehicle 12.

Figure 7D:
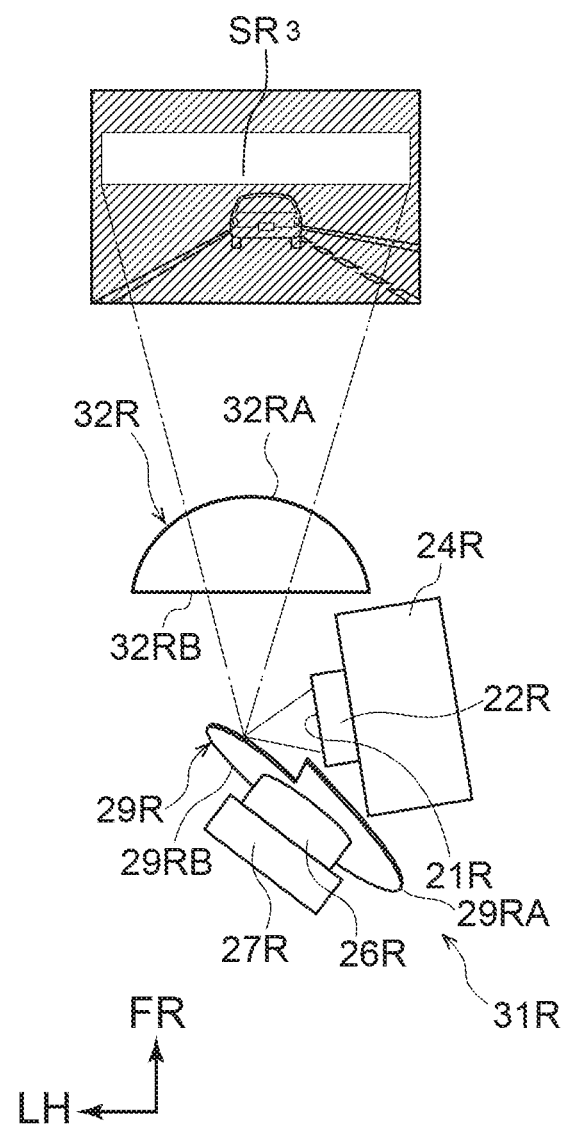
FIG. 7D is an explanatory diagram schematically illustrating an illuminated sub-region $SR_3$ illuminated by the right front headlight according to a second exemplary embodiment.

As illustrated in FIG. 7D, an illuminated sub-region $SR_3$ is formed by reflected light that is light emitted from the light source 21R and reflected by the second mirror body 29RB when stationary at a fourth stationary position in a state rotated by a further 72° from the third stationary position (216° from the first stationary position). The illuminated sub-region $SR_3$ has a rectangular shape with its length direction along the left-right direction, and is formed at a position shifted by a predetermined height toward the upper side from the central position to an upper-central position ahead of the vehicle 12.

As illustrated in FIG. 7E, an illuminated sub-region $SR_4$ is formed by reflected light that is light emitted from the light source 21R and reflected by the second mirror body 29RB when stationary at a fifth stationary position in a state rotated by a further 72° from the fourth stationary position (288° from the first stationary position). The illuminated sub-region $SR_4$ has a rectangular shape with its length direction along the left-right direction, and is formed at an upper end position ahead of the vehicle 12.

When the second mirror body 29RB is rotated a further 72° from the fifth stationary position (360° from the first stationary position), the rotating mirror 31R returns to its original state as illustrated in FIG. 7A, and light is reflected by the first mirror body 29RA again.

Namely, as the mirror bodies 29R of the right rotating mirror 31R undergo one full revolution, a shift occurs from the lower end position toward the upper end position ahead of the vehicle 12 via the rectangular illuminated sub-regions $SR_1$, $SR_2$, $SR_3$, $SR_4$, each having a length direction along the left-right direction. Accordingly, continuously rotating the rotating mirror 31R (mirror bodies 29R) at a predetermined speed or greater (for example at 200 Hz) results in consecutive high-speed shifts through the illuminated sub-regions $SR_1$, $SR_2$, $SR_3$, $SR_4$ from the lower end position toward the upper end position ahead of the vehicle 12.

Figure 8:
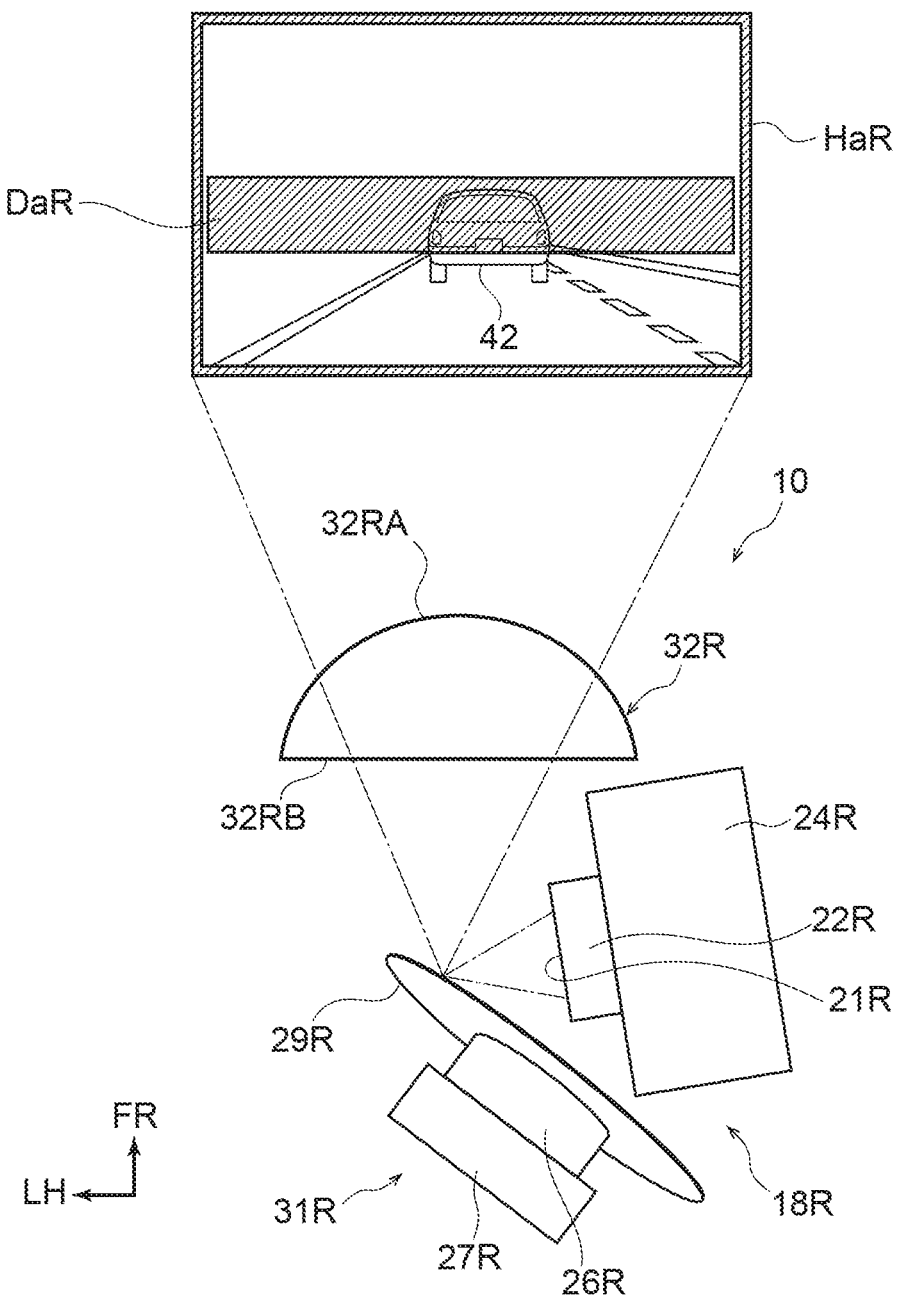
FIG. 8 is an explanatory diagram illustrating a first illuminated region, a first non-illuminated region, and a third non-illuminated region formed by a right front headlight according to the second exemplary embodiment.

Accordingly, as illustrated in FIG. 8, due to the afterimage effect of the light, to the human eye, the substantially rectangular first illuminated region HaR appears ahead of the vehicle 12. The length direction of the first illuminated region HaR runs along the left-right direction, and is formed with a linear first non-illuminated region DaR with its length direction along the left-right direction at a position at a predetermined height and including a portion where the leading vehicle 42 is present.

Explanation next follows regarding a second illuminated region HaL (see FIG. 10) formed by light (reflected light) reflected by the rotating mirror 31L of the left high beam unit 18L.

As illustrated in FIG. 9A, an illuminated sub-region $SL_1$ is formed by reflected light (visible light) that is light emitted from the light source 21L and reflected by the first mirror body 29LA when stationary at a predetermined first stationary position, for example. The illuminated sub-region $SL_1$ has a rectangular shape with its length direction along the vertical direction, and is formed at a predetermined left end position ahead of the vehicle 12.

As illustrated in FIG. 9B, an illuminated sub-region $SL_2$ is formed by reflected light that is light emitted from the light source 21L and reflected by the first mirror body 29LA when stationary at a second stationary position in a state rotated by, for example, 720 from the first stationary position. The illuminated sub-region $SL_2$ has a rectangular shape with its length direction along the vertical direction, and is formed at a position shifted toward the right (a position on the left of a central position) from the predetermined left end position ahead of the vehicle 12.

Figure 9C:
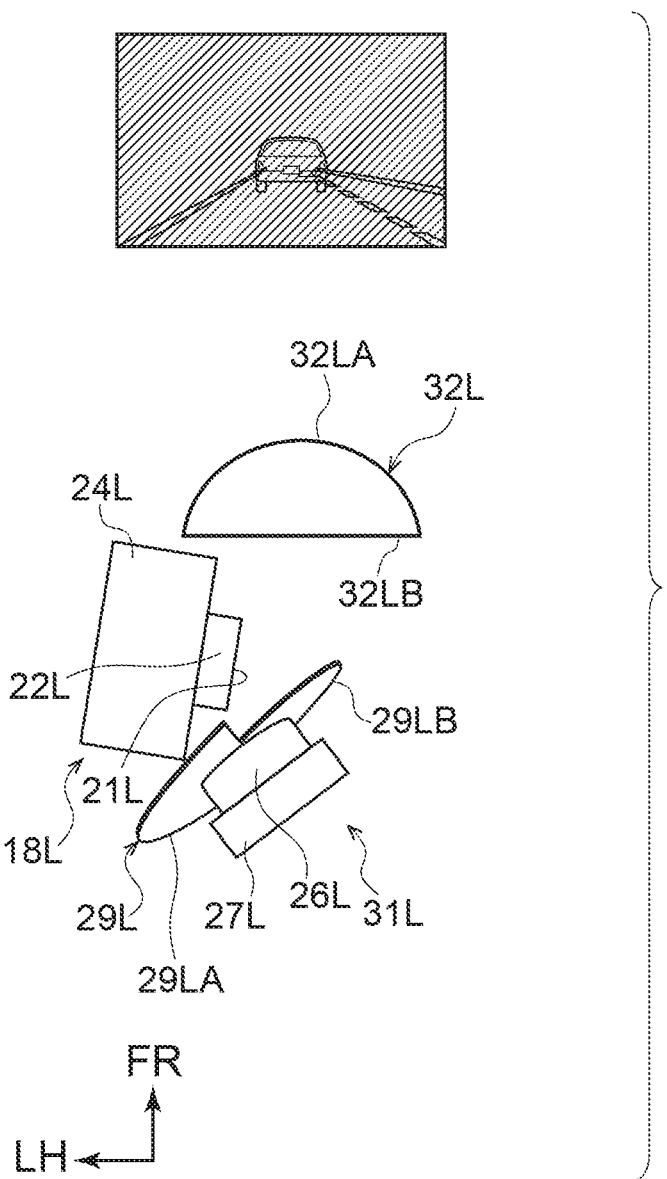
FIG. 9C is an explanatory diagram schematically illustrating a non-illuminated region according to the second exemplary embodiment.

As illustrated in FIG. 9C, light is not reflected by the first mirror body 29LA or the second mirror body 29LB when stationary at a third stationary position in a state rotated by a further 72° from the second stationary position (144° from the first stationary position). Namely, the light source 21L is switched OFF under the control of the controller 40 when at the third stationary position. Accordingly, A non-illuminated region where light is not shone is thereby at a predetermined position (a substantially vehicle width direction central position including a portion where a leading vehicle 42 is present) ahead of the vehicle 12.

As illustrated in FIG. 9D, an illuminated sub-region $SL_3$ is then formed by reflected light that is light emitted from the light source 21L and reflected by the second mirror body 29LB when stationary at a fourth stationary position in a state rotated by a further 72° from the third stationary position (216° from the first stationary position). The illuminated sub-region $SL_3$ has a rectangular shape with its length direction along the vertical direction, and is formed at a position shifted toward the right from the central position ahead of the vehicle 12.

As illustrated in FIG. 9E, an illuminated sub-region SL is formed by reflected light that is light emitted from the light source 21L and reflected by the second mirror body 29LB when stationary at a fifth stationary position in a state rotated by a further 72° from the fourth stationary position (288° from the first stationary position). The illuminated sub-region $SL_4$ has a rectangular shape with its length direction along the vertical direction, and is formed at a predetermined right end position ahead of the vehicle 12.

When the second mirror body 29LB is rotated a further 72° from the fifth stationary position (360° from the first stationary position), the rotating mirror 31L returns to its original state as illustrated in FIG. 9A, and light is reflected by the first mirror body 29LA again.

Namely, as the mirror bodies 29L of the left rotating mirror 31L undergo one full revolution, a shift occurs from one end to the other (from left to right) in the vehicle width direction ahead of the vehicle 12 via the rectangular illuminated sub-regions $SL_1$, $SL_2$, $SL_3$, $SL_4$, each having a length direction along the vertical direction. Accordingly, continuously rotating the rotating mirror 31L (mirror bodies 29L) at a predetermined speed or greater (for example at 200 Hz) results in consecutive high-speed shifts through the illuminated sub-regions $SL_1$, $SL_2$, $SL_3$, $SL_4$ from one end to the other (from left to right) in the vehicle width direction ahead of the vehicle 12.

Figure 10:
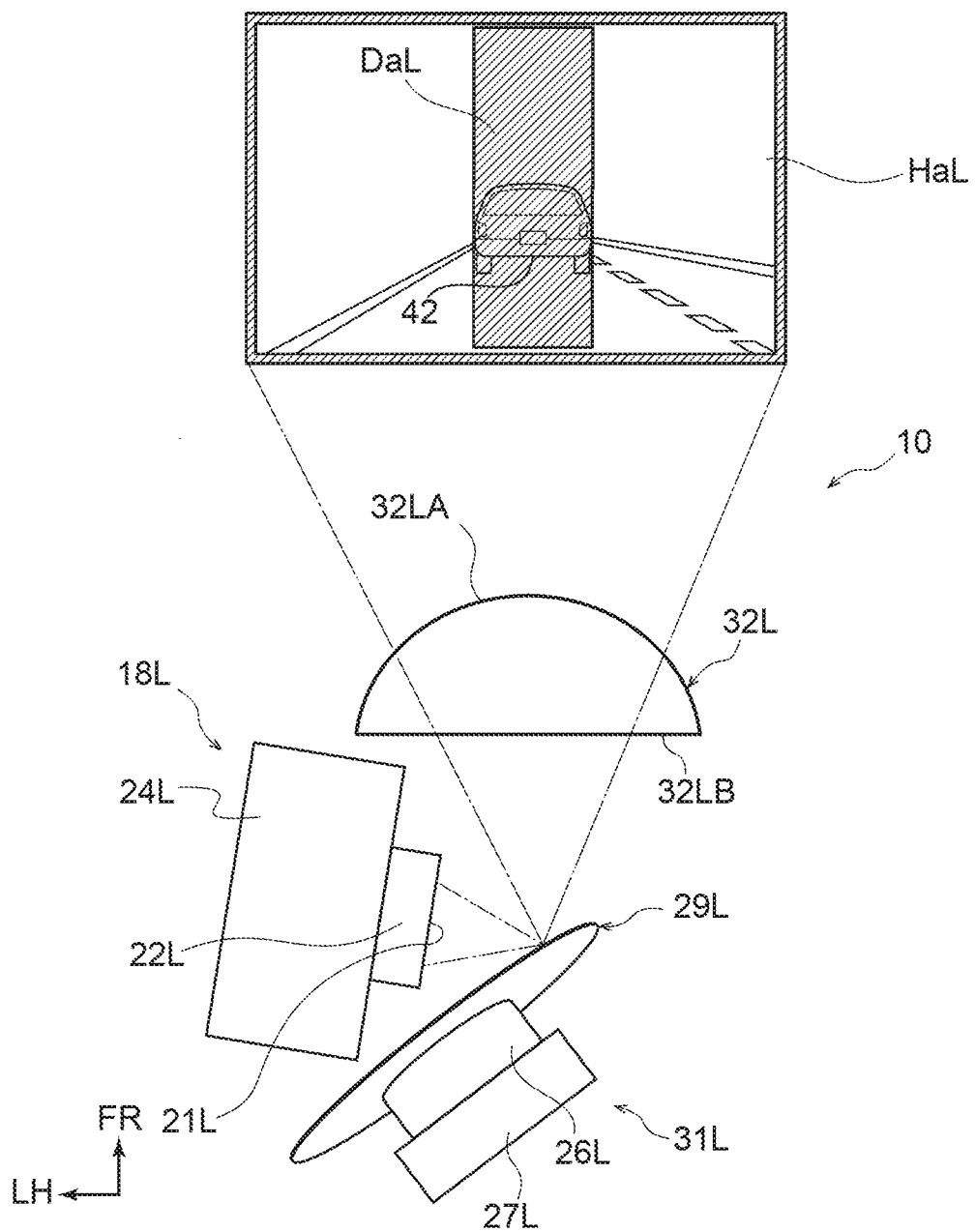
FIG. 10 is an explanatory diagram illustrating a second illuminated region, a second non-illuminated region, and a third non-illuminated region formed by a left front headlight according to the second exemplary embodiment.

Accordingly, as illustrated in FIG. 10, due to the afterimage effect of the light, to the human eye, the substantially rectangular second illuminated region HaL appears ahead of the vehicle 12. The length direction of the second illuminated region HaL runs along the left-right direction, and is formed with a linear second non-illuminated region DaL with its length direction along the vertical direction at a substantially vehicle width direction central position and including a portion where the leading vehicle 42 is present.

Figure 11:
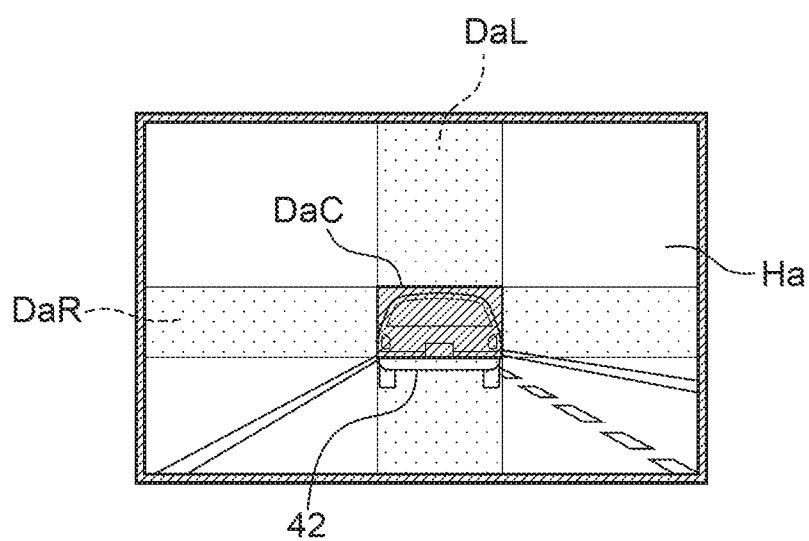
FIG. 11 is an explanatory diagram illustrating a high beam light distribution area including a third non-illuminated region, formed by left and right front headlights according to the second exemplary embodiment.

In the high beam light distribution area Ha, the first illuminated region HaR illuminated by the right high beam unit 18R and the second illuminated region HaL illuminated by the left high beam unit 18L are superimposed on each other. Thus, as illustrated in FIG. 11, in the high beam light distribution area Ha formed, the third non-illuminated region DaC is the only non-illuminated region.

Namely, in the high beam light distribution area Ha, the first non-illuminated region DaR in the first illuminated region HaR is illuminated by the second illuminated region HaL, and the second non-illuminated region DaL in the second illuminated region HaL is illuminated by the first illuminated region HaR. Naturally, the light intensity at the portions illuminated by only the first illuminated region HaR or the second illuminated region HaL is lower than the light intensity at portions where the first illuminated region HaR and the second illuminated region HaL are superimposed on each other.

Explanation follows regarding operation of the vehicle front headlight device 10 according to the second exemplary embodiment configured as described above (explanation of common operation with respect to the first is exemplary embodiment omitted as appropriate).

When the vehicle 12 is traveling at night or the like, the high beam is switched ON as required. Namely, the driver operates a switch to drive rotation of the rotating mirrors 31R, 31L and switch ON the light sources 21R, 21L, or the controller 40 drives rotation of the rotating mirrors 31R, 31L and switches on the light sources 21R, 21L based on information detected by the recognition device 34 and the like provided to the vehicle 12.

When this is performed, light (visible light) emitted from the light source 21R is reflected by the rotation-driven rotating mirror 31R (the first mirror body 29RA and the second mirror body 29RB), passes through the lens 32R, and is shone ahead of the vehicle. The first illuminated region HaR is thus formed ahead of the vehicle 12 (see FIG. 8).

Moreover, light (visible light) emitted from the light source 21L is reflected by the rotation-driven rotating mirror 31L (the first mirror body 29LA and the second mirror body 29LB), passes through the lens 32L, and is shone ahead of the vehicle. The second illuminated region HaL is thus formed ahead of the vehicle 12 (see FIG. 10).

The first illuminated region HaR formed by the high beam unit 18R and the second illuminated region HaL formed by the high beam unit 18L are superimposed on each other to form the high precision high beam light distribution area Ha (see FIG. 11) that is further ahead and at the upper side of the low beam light distribution area.

Note that as illustrated in FIG. 11, in the vehicle front headlight device 10 according to the second exemplary embodiment, the first non-illuminated region DaR formed in the first illuminated region HaR is illuminated by the second illuminated region HaL, and the second non-illuminated region DaL formed in the second illuminated region HaL is illuminated by the first illuminated region HaR. This enables the range of a non-illuminated region in the high beam light distribution area Ha shone ahead of the vehicle 12 to be reduced.

Namely, in the vehicle front headlight device 10 according to the second exemplary embodiment, the non-illuminated region in the high beam light distribution area Ha can be confined to just the third non-illuminated region DaC corresponding to the leading vehicle 42. Thus, switching ON the high beam when the vehicle 12 is traveling at night or the like enables the visibility ahead of the vehicle to be improved for the driver of the vehicle 12. Moreover, the driver of the leading vehicle 42 and so on may be suppressed or prevented from being dazzled even when the high beam is switched on when the vehicle 12 is traveling at night or the like.

Note that the leading vehicle 42 is recognized by the recognition device 34 and the detection device provided to the vehicle 12, and the controller 40 forms the third non-illuminated region DaC according to the recognition result (the controller 40 adjusts the timings at which the respective LEDs of the light sources 21R, 21L are switched off and on to adjust the position of the third non-illuminated region DaC), such that the third non-illuminated region DaC does not diverge from the leading vehicle 42.

Moreover, since the predetermined height position and the substantially vehicle width direction central position of the high beam light distribution area Ha are only illuminated by either the first illuminated region HaR or the second illuminated region HaL, the light intensity is lower than at other portions of the high beam light distribution area Ha excluding the third non-illuminated region DaC (portions where the first illuminated region HaR are the second illuminated region HaL are superimposed).

However, although visibility ahead of the vehicle is reduced for the driver of the vehicle 12 in the vehicle front headlight device 10 according to the second exemplary embodiment compared to the vehicle front headlight device 10 according to the first exemplary embodiment, visibility ahead of the vehicle for the driver of the vehicle 12 can still be improved (a reduction in visibility ahead of the vehicle for the driver of the vehicle 12 may be suppressed or prevented) compared to the vehicle front headlight device 100 according to the comparative example.

Although the vehicle front headlight devices 10 according to the respective exemplary embodiments have been described above with reference to the drawings, the vehicle front headlight devices 10 according to respective exemplary embodiments are not limited to those illustrated in the drawings, and design modifications may be implemented as appropriate within a range not departing from the spirit of the present disclosure.

For example, in the second exemplary embodiment, the plural LEDs of the respective light sources 21R, 21L may be configured so as to be capable of being switched on and off individually. In the second exemplary embodiment, such a configuration would have the advantage of not requiring formation of the first non-illuminated region DaR and the second non-illuminated region DaL except for at the third non-illuminated region DaC. Namely, the second exemplary embodiment would enable the third non-illuminated region DaC alone to be formed corresponding to the leading vehicle 42.

Moreover, in the first exemplary embodiment illustrated in FIG. 2A to FIG. 2D and FIG. 4A to FIG. 4D, as an example the shifts through the respective illuminated sub-regions SR, SL are made in four stages, and so the rotating mirrors 30R, 30L are rotated through an angle of 90° each time. However, there is no limitation to this angle. Similarly, in the second exemplary embodiment illustrated in FIG. 7A to FIG. 7E and FIG. 9A to FIG. 9E, as an example the shifts through the respective illuminated sub-regions SR, SL are made in five stages, and so the rotating mirrors 31R, 31L are rotated through an angle of 72° each time. However, there is no limitation to this angle.

Moreover, configuration may be made in which the third non-illuminated region DaC where the high beam is not shone on the leading vehicle 42 is not formed in the high beam light distribution area Ha in cases in which a leading vehicle 42 is not present (in cases in which a leading vehicle 42 has not been recognized by the recognition device 34 or the detection device). Namely, configuration may be such that the respective LEDs of the light sources 20R, 20L or the rows of LEDs of the light sources 21R, 21L that were switched OFF at a predetermined timing are not switched OFF at this timing.

Moreover, configuration may be made such that the third non-illuminated region DaC is formed not only corresponding to the leading vehicle 42, but also corresponding to pedestrians recognized by the recognition device 34 or the detection device. Namely, the controller 40 may be configured so as to adjust the timings at which the respective LEDs of the light sources 20R, 20L, or the rows of LEDs of the light sources 21R, 21L, are switched OFF and switched ON according to the distance to a pedestrian (the position of the pedestrian with respect to the vehicle 12) that has been recognized by the recognition device 34 or the detection device.

The vehicle front headlight devices 10 according to the respective exemplary embodiments are not limited to configurations applied to the high beam units 18 (18R, 18L). The vehicle front headlight device 10 according to the present disclosure may, for example, be provided to a headlamp unit 14 separate to the high beam units 18 and the low beam units 16.

What is claimed is:

1. A vehicle front headlight device comprising:
   a first front headlight and a second front headlight configuring a left and right pair, each including a light source configured to emit light, a rotating mirror configured to reflect light emitted from the light source while rotating, and a lens configured to allow light reflected by the rotating mirror to pass through and shine ahead of a vehicle; and
   a controller configured to control switching ON and OFF of the respective light sources and rotational drive of the respective rotating mirrors of the first front headlight and the second front headlight, such that, in a light distribution region formed by illumination of the first front headlight and the second front headlight, a first non-illuminated region that is not illuminated by the first front headlight is illuminated by the second front headlight, and a second non-illuminated region that is not illuminated by the second front headlight is illuminated by the first front headlight.

2. The vehicle front headlight device of claim 1, wherein:
   the controller is configured to control switching ON and OFF of the respective light sources and rotational drive of the respective rotating mirrors of the first front headlight and the second front headlight, so as to form a third non-illuminated region that is illuminated by neither the first front headlight nor the second front headlight in a light distribution region formed by illumination by the first front headlight and the second front headlight.

3. The vehicle front headlight device of claim 2, further comprising a recognition section configured to recognize a leading vehicle,
   wherein the controller is configured to form the third non-illuminated region with respect to the leading vehicle recognized by the recognition section.

* * * * *

UNITED STATES PATENT AND TRADEMARK OFFICE
CERTIFICATE OF CORRECTION

PATENT NO. : 10,640,034 B1
APPLICATION NO. : 16/695787
DATED : May 5, 2020
INVENTOR(S) : Fumihiko Mouri and Takahiko Honda It is certified that error appears in the above-identified patent and that said Letters Patent is hereby corrected as shown below:

On the Title Page

Item (72), inventors, inventor 1, address, delete "Owariasahi" and insert --Owariasahi-shi Aichi-ken--, therefor.

Item (72), inventors, inventor 2, address, delete "Toyota" and insert --Toyota-shi Aichi-ken--, therefor.

In the Specification

In Column 6, Line(s) 23, delete "SRl" and insert --$SR_1$--, therefor.

In Column 10, Line(s) 4, delete "$SL_1$" and insert --$SL_{11}$--, therefor.

In Column 11, Line(s) 41, delete "20L," and insert --20L--, therefor.

In Column 13, Line(s) 63, before "non-illuminated", delete "A" and insert --a--, therefor.

In Column 14, Line(s) 11, delete "SL" and insert --$SL_4$--, therefor.

Signed and Sealed this
Thirtieth Day of June, 2020

Andrei Iancu
*Director of the United States Patent and Trademark Office*